United States Patent Office 3,810,899
Patented May 14, 1974

3,810,899
2-HYDROXY-N-SUBSTITUTED-MORPHINAN DERIVATIVES
Ernest Mohacsi, Nutley, and Willy Leimgruber, Montclair, N.J., assignors to Hoffmann-La Roche Inc., Nutley, N.J.
No Drawing. Continuation-in-part of abandoned application Ser. No. 233,715, Mar. 10, 1972. This application Oct. 20, 1972, Ser. No. 299,478
Int. Cl. C07d 43/28
U.S. Cl. 260—285      12 Claims

ABSTRACT OF THE DISCLOSURE

Novel 2- and 4-hydroxymorphinan derivatives, which may bear a variety of N-substituents, are disclosed. These morphinans are useful as analgesic agents and are also useful as antagonists of certain strong analgesics such as morphine.

RELATED APPLICATIONS

This application is a continuation-in-part application of co-pending application Ser. No. 233,715 filed Mar. 10, 1972, in the names of Mohacsi and Leimgruber and now abandoned.

DETAILED DESCRIPTION OF THE INVENTION

The present invention relates to novel 2- and 4-hydroxymorphinans. More particularly, this invention covers 2- and 4-hydroxymorphinan derivatives which may bear a variety of N-substituents. The invention further comprehends processes for making these novel morphinans and novel intermediates employed in these processes.

More specifically, the compounds of the present invention are selected from the group consisting of compounds of the formula

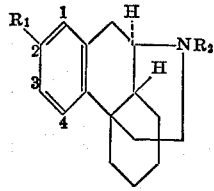

(I)

and of the formula

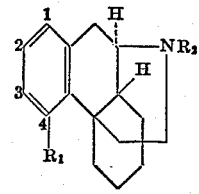

(II)

wherein $R_1$ signifies hydroxy, lower alkoxy, or acyloxy and $R_2$ signifies hydrogen, lower alkyl, cycloalkyl-lower alkyl, aryl-lower alkyl, lower alkenyl or lower alkynyl, the pharmaceutically acceptable acid addition salts thereof and the optical antipodes thereof.

As used herein, the term "lower alkyl" either alone or in combination refers to straight and branched chain hydrocarbon groups containing from 1 to 7, preferably from 1 to 4, carbon atoms such as, for example, methyl, ethyl, propyl, isopropyl, butyl, t-butyl and the like with methyl being preferred. The term "lower alkenyl" includes straight and branched chain hydrocarbon groups containing from 2–7 carbon atoms, wherein at least one carbon to carbon bond is unsaturated, such as allyl, butenyl, dimethyl allyl and the like. The term "lower alkynyl" refers to groups such as propargyl and the like. The term "cycloalkyl" refers to cyclic hydrocarbon groups containing from 3–7 carbon atoms such as cyclopropyl, cyclobutyl, cyclopentyl, cyclohexyl and the like with cyclopropyl being preferred. The term "lower alkoxy" refers to both straight and branched chain alkoxy radicals containing from 1 to 7 carbon atoms such as methoxy, ethoxy, propoxy, butoxy and the like, with methoxy being preferred. The term "acyloxy" includes both lower alkanoyloxy and aroyloxy groups. The term "lower alkanoyloxy" refers to both straight and branched chain aliphatic carboxylic acid moieties containing from 2 to 7 carbon atoms such as acetoxy, propionyloxy, butyryloxy and the like, with acetoxy being preferred. The term "aroyloxy" refers to aromatic carboxylic acid moieties such as benzoyloxy and the like. The term "aryl" denotes the organic radical derived by the removal of a hydrogen atom from an aromatic hydrocarbon, such as, for example, phenyl or phenyl substituted by halogen, nitro, lower alkyl or lower alkoxy.

The compounds of Formulae I and II above can be prepared following a variety of procedures:

(A) In one process aspect of the present invention, the compounds of Formula I above in which $R_1$ signifies lower alkoxy and $R_2$ signifies hydrogen, i.e. compounds of the formula

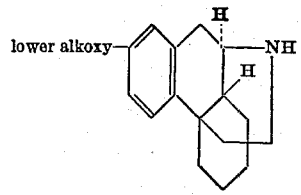

(Ia)

are prepared via a series of steps, the key step involving the acid catalyzed cyclization of a 1-(m-alkoxybenzyl)-1,2,3,4,5,6,7,8-octahydroisoquinoline substituted in the 2-position, i.e. on the nitrogen, with an electron withdrawing group followed by the base catalyzed hydrolysis of the electron withdrawing group. A detailed description of this preparative approach to morphinan derivatives is found in the Leimgruber, Mohacsi U.S. Pat. 3,634,429 issued Jan. 11, 1972.

In the first step of this process aspect, cyclohexen(1)-yl-ethylamine (III) is condensed with m-alkoxy-phenylacetic acid (IV) to yield N-2-(1-cyclohexen-1-yl)ethyl-m-alkoxyphenylacetamide (V). This reaction can be depicted as follows:

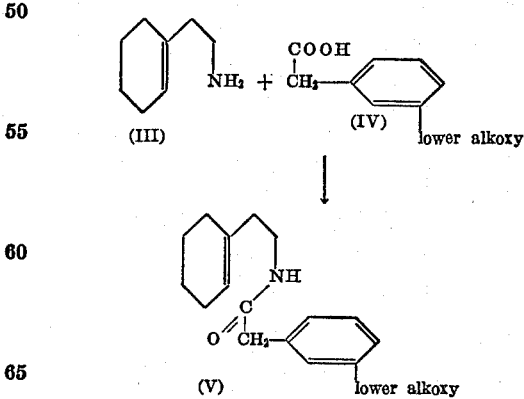

The condensation of the compounds of Formulae III and IV is preferably effected in the presence of an inert organic solvent such as toluene or xylene and at the reflux temperature of the reaction medium with continuous removal of the water being formed.

The so-obtained compound of Formula V is then cyclized, employing a Bischler-Napieralski type cyclization with phosphorus oxychloride to yield a compound of the formula:

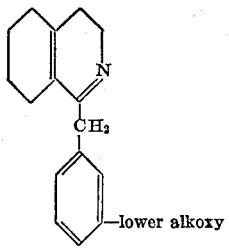

(VI)

This cyclization to the compound of Formula VI is expediently effected in the presence of an inert organic solvent such as toluene or xylene at elevated temperatures.

The compound of Formula VI is then reduced, for example with sodium borohydride, to yield the corresponding octahydroisoquinoline of the formula

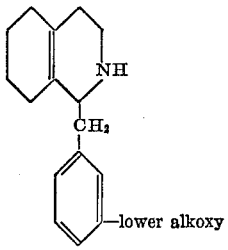

(VII)

The electron withdrawing group is then introduced into the 2-position of the 1-(m-alkoxybenzyl)-octahydroisoquinoline molecule. The electron withdrawing groups drastically reduce the basicity of the nitrogen atom. Representative of such groups suitable for the purposes of the present process are formyl, acetyl, benzoyl and sulfonyl, with formyl being the most preferred. The method of introducing the electron withdrawing group into the compound of Formula VII varies with the nature of the group but is usually achieved following conventional procedures. Thus, for example, a formyl group can be introduced by reacting the Formula VII compound with methyl formate or with chloral; an acetyl group can be attached by acetylation with acetic anhydride in pyridine. The Formula VII compound can be ethoxy carboxylated with ethyl chloroformate, or benzoylated with benzoyl chloride. In a preferred aspect, the compound of Formula VII is formylated with methyl formate in the presence of a catalytic amount of sodium methoxide to yield a compound of the formula

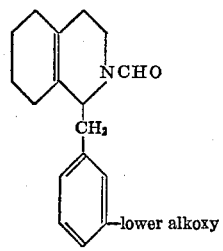

(VIII)

The 1-(m-alkoxybenzy)-octahydroisoquinoline bearing an electron withdrawing group in the 2-position, as represented by the compound of Formula VIII, is then cyclized using acid catalysis to yield a mixture of the 2- and 4-alkoxymorphinans, each of which bears the electron withdrawing group on the nitrogen atom.

The acids which can be employed to catalyze this cyclization are preferably phosphoric acid or polyphosphoric acid (PPA), either singly or in admixture with sulfuric acid. These acids can be used in the presence of solvents but they need not be. The concentration of the acid used is not critical, but for convenience commercially available concentrated acids are used.

The 2-alkoxymorphinan bearing an electron withdrawing group on the nitrogen atom, which is the major reaction product obtained upon cyclization of the 1-(m-alkoxybenzyl)-octahydroisoquinoline having an electron withdrawing group in the 2-position, is then isolated from the mixture by conventional separation techniques, such as column chromatography, countercurrent distribution, liquid-liquid extraction and fractional crystallization, with fractional crystallization being the preferred technique. It should be noted that if the 1-(m-alkoxybenzyl)-octahydroisoquinoline is resolved into its optically active antipodes prior to cyclization, as will be discussed in detail hereinafter, cyclization yields a mixture of the appropriate antipodes of the 2- and 4-alkoxy morphinans bearing the electron withdrawing group on the nitrogen. Separation of the 2- and 4-substituted antipodes is then expediently effected by first removing the electron with drawing group to yield the corresponding NH compounds as described hereafter. Then the 2-alkoxy antipode is isolated by first preparing a suitable salt, preferably the phosphate salt and then separating the salts by fractional crystallization.

When the preferred formyl group is used as the electron withdrawing group, the above discussed separation yields the 2-alkoxy-N-formylmorphinan of the formula

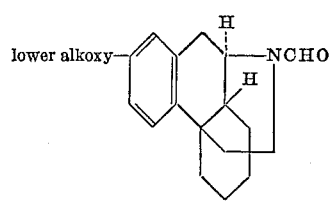

(IX)

The electron withdrawing group present on the nitrogen can then be removed using conventional techniques, for example, acid or base hydrolysis. When the preferred formyl group is used, base hydrolysis is preferable, employing alkali metal hydroxides such as sodium hydroxide and potassium hydroxide or alkaline earth metal hydroxides such as calcium hydroxide. Removal of the electron withdrawing group yields the 2-alkoxymorphinan of Formula Ia above.

The N-formyl intermediate of Formula IX above is novel and as such is a part of the present invention.

In another process aspect, the N-formyl compound of Formula IX can be reduced, for instance with lithium aluminum hydride, to yield the corresponding 2-alkoxy-N-methylmorphinan. Alternatively, this N-methyl derivative can be prepared by the reductive methylation of the compound of Formula Ia above employing aqueous formaldehyde and hydrogen in the presence of Raney nickel.

It should also be noted that, if desired, the m-alkoxybenzyloctahydroisoquinoline can be converted to the m-hydroxybenzyloctahydroisoquinoline which after formylation followed by cyclization gives a mixture of 2- and 4-hydroxy-N-formylmorphinan.

(B) In another process aspect of the present invention, the compounds of Formula I and wherein $R_1$ signifies hydroxy can be prepared by treating the corresponding compound wherein $R_1$ is lower alkoxy with an ether cleaving reagent. The ether cleavage can be effected using aqueous acids such as hydrobromic acid or hydroiodic acid, Lewis acids such as boron tribromide, or pyridine hydrochloride, with pyridine hydrochloride being prefered.

(C) In still another process aspect, the compounds of Formula I above wherein $R_1$ signifies acyloxy can be prepared by the acylation of the corresponding compound wherein $R_1$ signifies hydroxy. If $R_2$ in the acylated product is to be other than hydrogen, it is preferable to first prepare the desired N-substituted derivative and then to acylate this derivative by using one molar equivalent or a slight excess over this of the acylating agent, in order to avoid unwanted by-products whose formation can be initiated by acylation of the nitrogen atom. Acylation can be accomplished following conventional techniques; as, for example, by treating the 2-hydroxy-N-substituted-morphinan with an acylating agent such as an acid anhydride, e.g. acetic anhydride, or an acid halide, e.g. acetyl chloride.

(D) In a further process aspect of the present invention, the N-substituted morphinans of Formula I above are prepared from the corresponding compounds wherein $R_2$ is hydrogen following conventional techniques. Thus, for example, the N-unsubstituted compound can be reacted with an alkylating agent to introduce the $R_2$ substituent. Suitable alkylating agents for this purpose include alkyl halides such as, methyl iodide, ethyl bromide, cyclopropylmethyl chloride, and the like and akenyl halides such as allyl bromide. This alkylation reaction is preferably effected in the presence of an inert organic solvent, such as dimethylformamide.

Alternatively, the N-substituent can be introduced by acylation of the —NH compound followed by reduction of the amide to the desired $R_2$ group. The acylation can be effected using conventional procedures, employing as the acylating agent acid anhydrides, such as acetic anhydride, isobutyric anhydride, propionic anhydride or acid halides, such as acetyl chloride, n-valeryl chloride, propionyl chloride, cyclopropane carboxylic acid chloride, cyclohexane carbonyl chloride, phenylacetyl chloride and the like. The acylation reaction can be effected in the presence of an inert organic solvent, such as benzene, methylene chloride, and the like and at room temperature or elevated temperatures.

The N-acylated morphinan is then reduced, for example, by treatment with lithium aluminum hydride, diisobutylaluminum hydride or sodium bis(2-methoxyethoxy) aluminum hydride, to yield the desired N-substituted compound of Formula I. Introduction of the N-substituent by this method can be depicted by the following Reaction Scheme A, in which preferred groups are shown.

REACTION SCHEME A

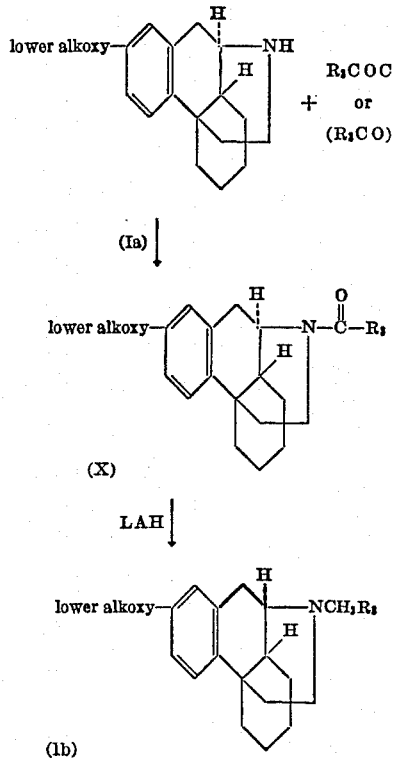

In the above reaction scheme, $R_3$ is lower alkyl, cycloalkyl, cycloalkyl-lower alkyl, aryl, aryl-lower alkyl, lower alkenyl or lower alkynyl.

If it is desired to prepare N-substituted morphinans of Formula I where $R_1$ is hydroxy via the acylation-reduction technique depicted in Reaction Scheme A, the N-substituent should be introduced first into the 2-alkoxy-morphinan and the alkoxy group then converted to the hydroxy group by the ether cleavage procedure discussed in process aspect B above. If it is desired to prepare N-substituted-morphinans of Formula I in which $R_1$ is an acyloxy group by this procedure, the N-substituent should be introduced before acylation of the 2-hydroxy group.

The intermediates of Formula X in Reaction Scheme A are novel and as such form a part of the instant invention.

(E) In a further process aspect, the compounds of Formula II are prepared from the mother liquor remaining after the isolation of the 2-alkoxy- or 2-hydroxy-morphinan as described in process aspect A above. The remaining mother liquor contains a mixture of the 2- and 4-substituted-morphinans. Separation of the 4-substituted compound is shown in the following Reaction Scheme B, in which the preferred groups and reagents are depicted.

REACTION SCHEME B

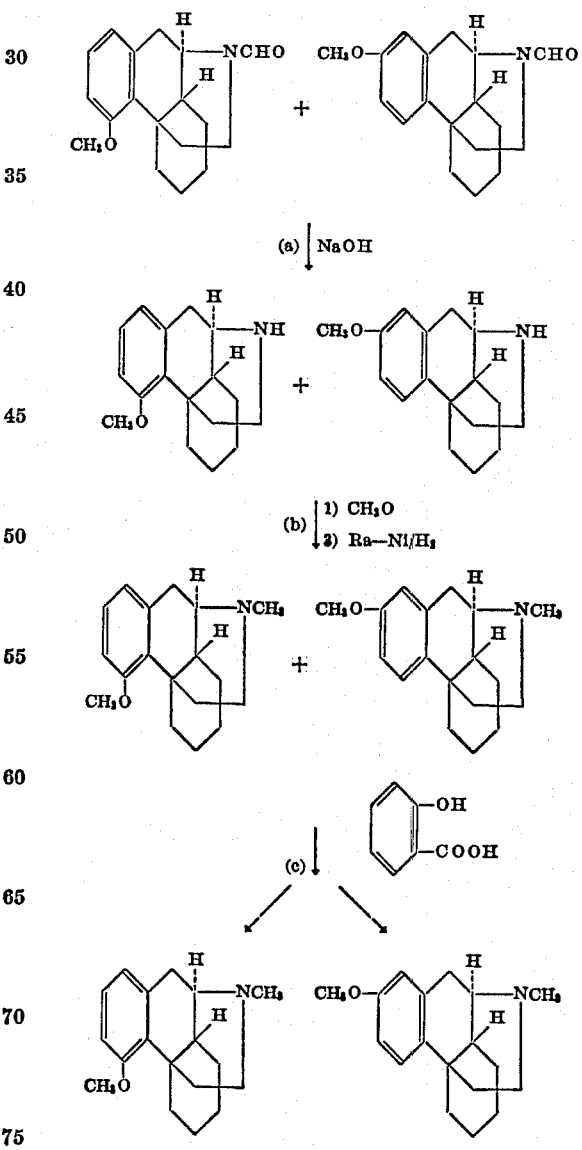

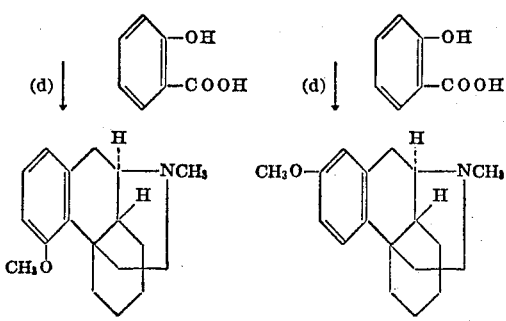

As shown in step (a), the mixture of the 2- and 4-substituted morphinans is hydrolyzed, preferably with methanolic sodium hydroxide, to remove the electron withdrawing group, the preferred formyl group being shown here. In step (b), the —NH compound is reductively methylated by treatment with formaldehyde followed by Raney-nickel/hydrogen reduction. The N-methylmorphinans are prepared since they form crystalline salts more readily than the N-unsubstituted morphinans; however, it is possible to proceed directly from step (a) to step (c).

In step (c), the N-methylmorphinans are treated with an acid that will yield a crystalline acid addition salt, preferably salicylic acid. In step (d) the 2- and 4- substituted isomers can be separated in the form of their salts, preferably their salicylates, by conventional separation techniques, with fractional crystallization being preferred.

Preparation of the 4-hydroxymorphinans can be effected following the same procedure as described above in process aspect B for the 2-hydroxy derivatives. Furthermore, the 4-acyloxy compounds can be prepared following the same general procedures as set forth in process aspect C above.

The N-substituted compounds of Formula II can be prepared from the —NH compounds by employing the same techniques as outlined in process aspect D above. Alternatively, these compounds can be prepared by reacting the N-methyl derivative with the appropriate acid halide, preferably chloride, and then reducing the resulting amide, for example, with lithium aluminum hydride, to obtain the desired N-substituted-morphinan of Formula II. Thus, for example, the N-methyl compound can be reacted with cyclopropylcarboxylic acid chloride in toluene and then the amide reduced with LAH to obtain the N-cyclopropylmethylmorphinan of Formula II above.

As is obvious from the structure of the compounds of Formulae I and II above, these compounds can exist in racemic form or as their optical antipodes. In the event an optical antipode rather than the racemate is the desired end product, some of the intermediates or the final products can be resolved by means well known in the art, for example, by formation of diastereomeric salts. This can be accomplished by reacting the racemic mixture of either an intermediate or the end product with an optically active acid. Suitable acids for this purpose include tartaric acid, camphorsulfonic acid, and di-(p-toluoyl)-tartaric acid, (—)di-O-isopropylidene-2 - keto - L - gulonic acid [(—)-DAG] and the like. The reaction between the racemic mixture and the optically active acid is preferably effected in the presence of a lower alkanol such as methanol, ethanol, propanol and the like with ethanol being preferred. The two diastereomeric salts thus obtained can then be separated because of their differing physical characteristics, i.e., solubility, crystal formation, etc. This separation is effected following standard techniques, for example, fractional crystallization, distillation, and the like, with fractional crystallization being preferred. After separation, the individual diastereomeric salts can be converted to the free optically active base by treatment with base. Suitable bases for this purpose include alkali metal hydroxides such as sodium hydroxide, potassium hydroxide and the like, alkaline earth metal hydroxides such as calcium hydroxide, and ammonium hydroxide, with ammonium hydroxide being preferred. It is advantageous to resolve the required starting materials, particularly the 1-(m-alkoxybenzyl)-1,2,3,4,5,6,7,8-octahydroisoquinolines, at the outset into the dextro- or levorotatory forms, depending upon the desired absolute configuration of the end product.

The compounds of Formulae I and II above form pharmaceutically acceptable acid addition salts with inorganic acids. Thus, the compounds of the present invention form pharmaceutically acceptable acid addition salts with inorganic acids such as hydrochloric acid, hydrobromic acid, sulfuric acid and phosphoric acid; and with organic acids such as tartaric acid, citric acid, camphorsulfonic acid, ethanesulfonic acid, toluenesulfonic acid, salicylic acid, ascorbic acid, maleic acid, succinic acid, formic acid, acetic acid and the like.

Preferred among the compounds of Formulae I and II above are those wherein $R_1$ signifies hydroxy. In the cases where $R_1$ denotes lower alkoxy, methoxy is preferred; and when $R_1$ signifies acyloxy, acetoxy is preferred. When the $R_2$ substituent is cycloalkyl-lower alkyl, cyclopropylmethyl is preferred; when $R_2$ is lower alkyl, methyl is preferred; and when $R_2$ is lower alkenyl, allyl and dimethyl allyl are preferred.

One preferred class of compounds falling within the scope of Formulae I and II above are those wherein $R_1$ signifies acyloxy, i.e., compounds of the formula

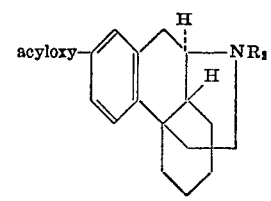

(I')

and of the formula

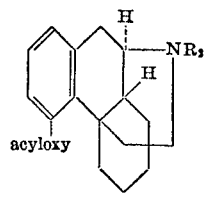

(II')

wherein $R_2$ is as described above.

Another preferred class of compounds falling within the scope of Formulae I and II above are those wherein $R_1$ signifies hydroxy, i.e., compounds of the formula

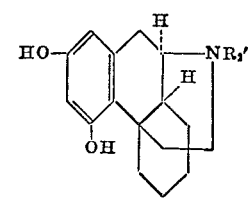

(I'')

and of the formula

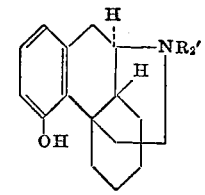

(II'')

wherein $R_2'$ signifies hydrogen, lower alkyl containing from 3 to 7 carbon atoms, cycloalkyl-lower alkyl, lower alkenyl, lower alkynyl, or aryl-lower alkyl; and R₂ is as described above.

Also preferred of the compounds within the scope of Formulae I and II above are those wherein R₁ signifies lower alkoxy, preferably methoxy, i.e., compounds of the formula

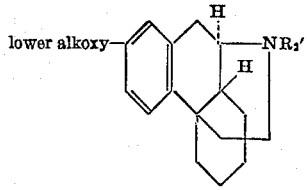

(I''')

and of the formula

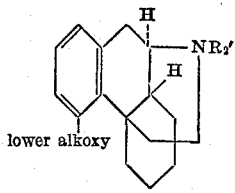

(II''')

wherein R₂ and R₂' are as described above.

The most preferred of the compounds of Formulae I and II above are:

(±)-4-methoxy-N-methylmorphinan
(±)-2-methoxy-N-cyclopropylmethylmorphinan
(+)-2-methoxy-N-cyclopropylmethylmorphinan
(−)-2-methoxy-N-cyclopropylmethylmorphinan
(+)-4-methoxy-N-cyclopropylmethylmorphinan
(−)-4-methoxy-N-cyclopropylmethylmorphinan
(+)-2-acetoxy-N-cyclopropylmethylmorphinan
(−)-2-acetoxy-N-cyclopropylmethylmorphinan
(±)-2-hydroxy-N-cyclopropylmethylmorphinan
(+)-4-hydroxy-N-cyclopropylmethylmorphinan
(−)-4-methoxy-N-methylmorphinan
(−)-4-hydroxy-N-methylmorphinan
(+)-2-hydroxy-N-cyclopropylmethylmorphinan
(−)-2-hydroxy-N-cyclopropylmethylmorphinan
(±)-2-hydroxy-N-allylmorphinan
(+)-2-hydroxy-N-allylmorphinan
(−)-2-hydroxy-N-allylmorphinan
(±)-2-hydroxy-N-(3,3-dimethylallyl)morphinan
(+)-2-hydroxy-N-dimethylallylmorphinan
(−)-2-hydroxy-N-dimethylallylmorphinan
(−)-4-hydroxy-N-cyclopropylmethylmorphinan
(±)-4-hydroxy-N-methylmorphinan.

The compounds of Formulae I and II above, in racemic form or as the dextro-rotatory or levo-rotatory antipodes, and the pharmaceutically acceptable acid addition salts of these racemates or optically active antipodes are useful as analgesic agents and are also useful as antagonists of certain strong analgesic agents such as morphine. Their pharmaceutiaclly useful activities are demonstrated in warm-blooded animals using standard procedures.

The analgesic activity of the compounds of Formulae I and II above is demonstrated in the standard phenylquinone writhing test (Sigmund et al., Proc. Soc. Exp. Biol. Med. 95: 729, 1957). This test is used to measure the analgesic effects of compounds in mice exposed to intra-abdominally induced chemical pain. Five male CF–1 mice, weighing 20–22 gms. were used per dose level. The $ED_{50}$ was the dose which reduced the total number of writhes by 50%. When the following representative compounds of the present invention are utilized as the test substances, analgesic activity is observed as shown for the following $ED_{50}$ level:

(−)-2-hydroxy-N-cyclopropylmethylmorphinan—$ED_{50}$=0.7–1.81 mg./kg. (s.c.)
(±)-2-hydroxy-N-cyclopropylmethylmorphinan—$ED_{50}$=1.7 mg./kg. (s.c.)
(+)-2-hydroxy-N-cyclopropylmethylmorphinan—$ED_{50}$=13.0 mg./kg. (s.c.)
(±)-2-hydroxy-N-(3,3-dimethylallyl)morphinan—$ED_{50}$=35 mg./kg. (s.c.)
(+)-2-hydroxy-N-dimethylallylmorphinan—$ED_{50}$=12.2 mg./kg. (s.c.)
(−)-2-hydroxy-N-dimethylallylmorphinan—$ED_{50}$=26 mg./kg. (s.c.)
(−)-2-hydroxy-N-allylmorphinan—$ED_{50}$=20 mg./kg. (s.c.)
(+)-4-hydroxy-N-cyclopropylmethylmorphinan—$ED_{50}$=5.4 mg./kg. (s.c.)
(−)-4-hydroxy-N-cyclopropylmethylmorphinan—$ED_{50}$=2.6 mg./kg. (s.c.)

Representative compounds of Formulae I and II above effectively counteract morphine analgesia. This activity can be demonstrated in the mice tail flick test for morphine antagonism. This test is used to measure narcotic antagonism. Compounds are given subcutaneously ten minutes prior to morphine sulfate. The percent elevation in reaction time was determined during each test for 10 mg./kg. s.c. of morphine sulfate and actual percent increase was used in calculating the percent antagonism of morphine analgesia. Morphine, 10 mg./kg. s.c., typically produced a 74% elevation in reaction time 30 minutes after s.c. administered when given alone. The percent antagonism was calculated according to the formula of Harris and Pierson, J. Pharmacol. Exp. Ther., 143: 141, 1964. When the following representative compounds of the present invention are utilized as the test substance, morphine antagonism activity is observed as shown by the following $ED_{50}$ levels:

(±)-2-hydroxy-N-cyclopropylmethylmorphinan—$ED_{50}$=8 mg./kg. (s.c.)
(+)-2-hydroxy-N-cyclopropylmethylmorphinan—$ED_{50}$=8 mg./kg. (s.c.)
(−)-2-hydroxy-N-cyclopropylmethylmorphinan—$ED_{50}$=7.5 mg./kg. (s.c.)
(±)-2-hydroxy-N-allylmorphinan—$ED_{50}$=2.5 mg./kg. (s.c.)
(−)-2-hydroxy-N-allylmorphinan—$ED_{50}$=5 mg./kg. (s.c.)
(+)-4-hydroxy-N-cyclopropylmethylmorphinan—$ED_{50}$=5.2 mg./kg. (s.c.)
(−)-4-hydroxy-N-cyclopropylmethylmorphinan—$ED_{50}$=16.0 mg./kg. (s.c.)

The compounds of Formulae I and II, their enantiomers and salts as herein described can be incorporated into standard pharmaceutical dosage forms, for example, they are useful for oral or parenteral application with the usual pharmaceutical adjuvant material, for example, organic or inorganic inert carrier materials such as water, gelatin, lactose, starch, magnesium stearate, talc, vegetable oils, gums, polyalkylene-glycols and the like. The pharmaceutical preparations can be employed in a solid form, for example, as tablets, troches, suppositories, capsules, or in liquid form, for example, as solutions, suspensions or emulsions. Pharmaceutical adjuvant materials can be added and include preservatives, stabilizers, wetting or emulsifying agents, salts to change the osmotic pressure or to act as buffers. The pharmaceutical preparations can also contain other therapeutically active substances.

The following examples further illustrate the invention. All temperatures are in degrees centigrade unless specified otherwise.

EXAMPLE 1

Preparation of N-2-(1-cyclohexen-1-yl)ethyl-m-methoxyphenylacetamide

A mixture of 75.0 g. (0.60 mol) of cyclohexene(1)-yl-ethylamine and 100.0 g. (0.60 mol) of 3-methoxyphenylacetic acid in 500 ml. of xylene was heated at reflux for 7 hr. with removal of the water by means of a Dean-Stark apparatus. After evaporation of the solvent, 200 ml. of hexane was added to the residue and the product was allowed to crystallize at room temperature. The crude amide was separated by filtration, and recrystallization from cyclohexane afforded pure N-2-(1-cyclohexen - 1 - yl)ethyl-m-methoxyphenylacetamide, M.P. 57–59°.

EXAMPLE 2

Preparation of ($\pm$)-1-(m-methoxybenzyl)1,2,3,4,5,6,7,8-octahydroisoquinoline

A mixture of 60.0 g. (0.22 mol) of N-2-(1-cyclohexen-1-yl)-ethyl - m - methoxyphenylacetamide, 120 ml. of $POCl_3$ and 500 ml. of dry toluene was heated at 100° for 0.5 hr. under nitrogen. After evaporation of the solvent and excess reagent, the residue was triturated with petroleum ether (2× 150 ml.). The petroleum ether insoluble material was dissolved in methylene chloride (600 ml.) and the solution washed successively with dilute aqueous ammonium hydroxide (600 ml.) and water (200 ml.). After drying, the solvent was removed in vacuo to give the crude hexahydroisoquinoline which was dissolved in methanol (500 ml.) and immediately reduced by portionwise addition of 25.0 g. (0.66 mol) of sodium borohydride over 2.5 hours with stirring at 20–30°. The reaction mixture was stirred at room temperature overnight. The methanol was distilled off and the residue was partitioned between ether (500 ml.) and dilute aqueous ammonium hydroxide. The ethereal solution was washed with water, dried and evaporated to give crude ($\pm$)-1-(m - methoxybenzyl) - 1,2,3,4,5,6,7,8 - octahydroisoquinoline, B.P. 160–164°/0.3 mm.

A solution of ($\pm$) - 1 - (m-methoxybenzyl) - 1,2,3,4,5,6,7,8 - octahydroisoquinoline, 196.0 g. (0.76 mol), in ethyl acetate (600 ml.) was saturated with dry hydrogen bromide and the hydrobromide allowed to crystallize at room temperature, the crystals were filtered and dried. The crude product was recrystallized from isopropanol to give pure ($\pm$) - 1 - (m - methoxybenzyl) - 1,2,3,4,5,6,7,8-octahydroisoquinoline hydrobromide, M.P. 181–183°.

A solution of 3.8 g. (0.015 mol) of ($\pm$) - 1 - (m-methoxybenzyl) - 1,2,3,4,5,6,7,8 - octahydroisoquinoline in 10 ml. of acetone was treated with a solution of 3.0 g. of oxalic acid in 60 ml. of acetone. The crystals were separated by filtration and dried to give crude ($\pm$)-1-(m-methoxybenzyl) - 1,2,3,4,5,6,7,8 - octahydroisoquinoline oxalate. A sample of this compound was recrystallized from ethanol, M.P. 172–173°.

EXAMPLE 3

Preparation of ($\pm$)-1-(m-methoxybenzyl)-N-(formyl-1,2,3,4,5,6,7,8-octahydroisoquinoline ($\pm$) - 1 - (m - methoxybenzyl) - 1,2,3,4,5,6,7,8 - octahydroisoquinoline hydrobromide, 200.0 (0.59 mol), was suspended in dlute aqueous sodium hydroxide and the suspension was extracted several times with methylene chloride (1 l.). The combined methylene chloride extracts were dried and the solvent was removed in vacuo to give the crude ($\pm$) - 1 - (m-methoxybenzyl)-N-formyl-1,2,3,4,5,6,7,8 - octahydroisoquinoline. It was dissolved in a mixture of 325 ml. of methyl formate and 1.04 g. of sodium methoxide and the solution heated at reflux overnight. The reaction mixture was concentrated under reduced pressure and the residue was dissolved in ether (500 ml.) and washed successively with 1 N hydrochloric acid (400 ml.) and water (100 ml.). The ethereal solution was dried and evaporated to give crude ($\pm$)-1-(m-methoxybenzyl) - N - formyl - 1,2,3,4,5,6,7,8 - octahydroisoquinoline. A sample of this compound was distilled, B.P. 187–190°/0.2 mm. and crystallized, M.P. 71–73°.

EXAMPLE 4

Preparation of ($\pm$)-2- and ($\pm$)-4-methoxy-N-formylmorphinan ($\pm$) - 1 - (m - methoxybenzyl) - N - formyl - 1,2,3,4,5-6,7,8, - octhydroisoquinoline, 150.0 g. (0.52 mol), was combined under stirring with 1125 g. of phosphoric acid which had been mixed with 22.5 g. of conc. sulfuric acid and the mixture was heated in a nitrogen atmosphere to 70°. The resulting homogeneous solution was kept at 70° for 38 hours. The reaction mixture was cooled in an ice bath and 4 l. of ice-water was added. The resulting suspension was extracted several times with ethyl acetate (a total of 4 l.), the combined organic phases were washed with water and dried. Filtration and concentration gave crude ($\pm$)-2- and ($\pm$) - 4 - methoxy-N-formylmorphinan, B.P. 195–210°/0.1 mm.

EXAMPLE 5

Separation of ($\pm$)-2-methoxy-N-formylmorphinan

The cyclization product, 110.0 g. (0.38 mol), consisting of ($\pm$)-2- and ($\pm$)-4-methoxy-N-formylmorphinan was dissolved in 2 l. of ether and a small quantity of insoluble material was removed by filtration. The ethereal solution was concentrated to a volume of about 400 ml. at atmospheric pressure under a constant stream of nitrogen. The resulting solution was seeded with ($\pm$)-2-methoxy-N-formylmorphinan and allowed to crystallize at 0° for 15 hours. The crystals were filtered, washed with cold ether and dried to give crude ($\pm$) - 2 - methoxy - N - formylmorphinan, M.P. 120–122°. The crude product was recrystallized from ether to give pure ($\pm$)-2-methoxy-N-formylmorphian, M.P. 123–125°.

EXAMPLE 6

Preparation of ($\pm$)-2-methoxymorphinan ($\pm$) - 2 - methoxy-N-formylmorphinan, 38.7 g. (0.13 mol), was dissolved in 900 ml. of methanol and 350 ml. of 2.5 N aqueous sodium hydroxide was added. After heating at reflux for 41 hours, the methanol was removed under reduced pressure and the resulting aqueous suspension was extracted with ether (3× 330 ml.). The combined ethereal extracts were washed with water and dried. Removal of the solvent in vacuo yielded crude ($\pm$)-2-methoxymorphinan, B.P. 130–140°/0.07 mm.

($\pm$) - 2 - methoxymorphinan, 1.0 g. (0.004 mol), on treatment with hydrogen chloride (anhydrous) in 3 ml. of ethyl acetate, afforded the crude hydrochloride, which after recrystallization from acetone gave pure ($\pm$)-2-methoxymorphinan hydrochloride, M.P. 231–233°.

EXAMPLE 7

Preparation of ($\pm$)-2-methoxy-N-methylmorphinan

To a suspension of 1.5 g. of lithium aluminum hydride in 200 ml. of anhydrous tetrahydrofuran, 20.0 g. (0.07 mol) of ($\pm$) - 2 - methoxy - N - formylmorphinan in 100 ml. of anhydrous tetrahydrofuran was added dropwise. After the mixture had been refluxed for 3 hours under nitrogen, it was cooled to room temperature and ethyl acetate followed by water were added dropwise. The resulting suspension was dried, filtered and the filtrate concentrated in vacuo to give crude ($\pm$)-2-methoxy-N-methylmorphinan. A sample of this compound was distilled, B.P. 185–205°/0.025 mm., then crystallized from petroleum ether, M.P. 75–77°.

EXAMPLE 8

Preparation of (±)-2-methoxy-N-methylmorphinan (±)-2-methoxymorphinan, 10.8 g. (0.042 mol), was dissolved in 250 ml. of methanol and added to 9 ml. of aqueous formaldehyde (37%). The solution was allowed to stand at room temperature overnight. After addition of 8.0 g. of Raney nickel and 250 ml. of methanol, the mixture was hydrogenated at room temperature for 20 hours. The catalyst was removed by filtration and washed with methanol. The solvent was evaporated in vacuo giving crude (±)-2-methoxy - N - methylmorphinan. The above base in 75 ml. of ethyl acetate was treated with a saturated solution of hydrogen chloride and kept at 0° for 1 hour. The product was separated by filtration to give the crude hydrochloride, M.P. 246° (dec.). Recrystallization from acetonitrile gave pure (±)-2-methoxy-N-methylmorphinan hydrochloride, M.P. 255–256°.

EXAMPLE 9

Preparation of (±)-2-hydroxy-N-methylmorphinan (A) (±)-2-methoxy - N - methylmorphinan, 4.0 g. (0.014 mole) in 50 ml. of 48% HBr was refluxed for 15 hours. The cooled solution was made basic with conc. ammonium hydroxide. The precipitate was filtered, and recrystallized from benzene-hexane to give (±)-2-hydroxy-N-methylmorphinan, M.P. 91–93°.

(B) A mixture of 10.0 g. (0.036 mol) of (±)-2-methoxy-N-methylmorphinan and 100 g. of pyridine hydrochloride was heated at 220° with stirring under nitrogen for 25 minutes, cooled in an ice bath, and diluted with 100 ml. of water. The mixture was made basic with conc. ammonium hydroxide and extracted with chloroform (900 ml.). The chloroform layer was washed with water and dried. Removal of the solvent gave crude (±)-2-hydroxy-N-methylmorphinan. This compound was treated with hydrogen chloride (anhydrous) in ethyl acetate and was taken to dryness. The crude hydrochloride was dissolved in hot ethanol and allowed to crystallize at −20°. The product was separated by filtration to give (±)-2-hydroxy-N-methylmorphinan hydrochloride, M.P. 284° (dec.). A sample of this compound was recrystallized from ethanol, M.P. 287–288°.

EXAMPLE 10

Preparation of (±)-2-acetoxy-N-methylmorphinan

A mixture of 4.74 g. (0.018 mol) of (±)-2-hydroxy-N-methylmorphinan and 20 g. of acetic anhydride was heated at reflux for 3 hours. The excess reagent was removed in vacuo and the residue partitioned between 300 ml. of ether and 100 ml. of 2 N potassium hydroxide. The ether layer was washed with 50 ml. of water, dried and concentrated to give crude (±)-2-acetoxy - N - methylmorphinan, B.P. 157–168°/0.75 mm.

(±)-2-acetoxy-N-methylmorphinan, 4.8 g. (0.016 mol) in 30 ml. of acetone, on treatment with a solution of 1.5 g. of oxalic acid in 30 ml. of acetone, gave (±)-2-acetoxy-N-methylmorphinan oxalate hydrate, M.P. 96–98°. A sample of this compound was recrystallized from acetone, M.P. 101–103°.

EXAMPLE 11

Preparation of (±)-2-hydroxymorphinan

A mixture of 2.0 g. (7.7 mmol) of (±)-2-methoxymorphinan and 20 g. of pyridine hydrochloride was heated at 220° with stirring under nitrogen for 15 minutes, cooled in an ice bath and diluted with 50 ml. of water. The mixture was made basic with conc. ammonium hydroxide and extracted with chloroform (400 ml.). The extract was washed with 20 ml. of water and dried. Removal of the solvent gave the crude phenol, M.P. 265° (dec.). Recrystallization from methanol gave pure (±)-2-hydroxymorphinan, M.P. 275° (dec.).

EXAMPLE 12

Preparation of (±)-2-hydroxy-N-allylmorphinan

A mixture of 6.5 g. (0.027 mol) of (±)-2-hydroxymorphinan, 3.9 g. of allylbromide, 4.6 g. of sodium bicarbonate and 65 ml. of dimethylformamide was stirred and refluxed under nitrogen for 4 hours. The reaction mixture was filtered and the filter cake washed with ethanol. The solvent was removed in vacuo and the product was dissolved in 200 ml. of ether and filtered from a small amount of insoluble material. The ether solution was extracted with 30 ml. of hydrochloric acid in 120 ml. of water. Addition of conc. ammonium hydroxide to the aqueous phase precipitated the crude product which was separated by filtration. This was dissolved in chloroform and dried. Removal of the solvent in vacuo gave (±)-2-hydroxy - N - allylmorphinan, which when recrystallized from acetonitrile, had a melting point of 172–174°.

(±)-2-hydroxy-N-allylmorphinan, 7.2 g. (0.025 mol), on treatment with hydrogen chloride (anhydrous) in ethyl acetate afforded (±)-2-hydroxy-N-allylmorphinan hydrochloride, M.P. 270–271°.

EXAMPLE 13

Preparation of (±)-2-hydroxy-N-(3,3-dimethylallyl)morphinan

A mixture of 500 mg. (2.0 mmol) of (±)-2-hydroxymorphinan, 370 mg. of anhydrous powdered potassium carbonate. 330 mg. of dimethylallyl bromide, and 7 ml. of dimethylformamide was heated at 120° with stirring under nitrogen for 5 minutes. The reaction mixture was cooled and poured into 10 ml. of water. The aqueous mixture was extracted into 100 ml. of ethyl acetate and the ethyl acetate layer was washed with water. After drying the solvent was removed in vacuo to give the crude product. Recrystallization from ethanol-water (4:1) gave pure (±)-2-hydroxy - N - (3,3-dimethylallyl)morphinan, M.P. 175–177°.

A sample of 163 mg. (0.53 mmol) of (±)-2-hydroxy-N - (3,3 - dimethylallyl)morphinan, on treatment with a saturated solution of hydrogen bromide in ethyl acetate afforded (±)-2-hydroxy-N-(3,3-dimethylallyl)morphinan hydrobromide which, after crystallization from water, melted at 234–236° (dec.).

A sample of 21.35 g. (0.067 mol) of (±)-2-hydroxy-N-(3,3-dimethylallyl)morphinan on treatment with a saturated solution of hydrogen chloride (anhydrous) in ethyl acetate afforded crude hydrochloride. Recrystallization from ethanol-hexane gave (±)-2-hydroxy-N-(3,3-dimethylallyl)morphinan hydrochloride, M.P. 238–240° (dec.).

EXAMPLE 14

Preparation of (±)-2-methoxy-N-acetylmorphinan

A mixture of 10.0 g. (0.039 mol) of (±)-2-methoxymorphinan and 7.5 g. of acetic anhydride was heated at 100° for 25 minutes. The reaction mixture was evaporated to dryness and the residue partitioned between 225 ml. of ether and 75 ml. of diluted ammonium hydroxide. The ether layer was washed with water and dried. Removal of the solvent gave crude (±)-2-methoxy-N-acetylmorphinan, which on distillation had a B.P. of 187–192°/0.05 mm.

EXAMPLE 15

Preparation of (±)-2-methoxy-N-valerylmorphinan

To 10.0 g. (0.039 mol) of (±)-2-methoxymorphinan, 9.4 g. of n-valeryl chloride was added dropwise at 100° over 25 minutes. The reaction mixture was stirred at this temperature for an additional 13 minutes and after cooling to room temperature, was partitioned between 400 ml. of chloroform and 200 ml. of dilute ammonium hydroxide. The chloroform layer was washed with 100 ml. of water and dried. Removal of the solvent gave crude (±)-

15

2-methoxy-N-valerylmorphinan, which on distillation had a B.P. of 215–235°/0.15 mm.

EXAMPLE 16

Preparation of (±)-2-methoxy-N-cyclopropylcarbonylmorphinan

To a mixture of 15.0 g. (0.058 mol) of (±)-2-methoxymorphinan, 40 ml. of triethylamine and 150 ml. of methylene chloride was added dropwise over a period of 45 minutes, a solution of 10 g. of cyclopropane carboxylic acid chloride in 50 ml. of methylene chloride. After the mixture had been refluxed for 15 hours, it was cooled to room temperature and washed successively with water, 2 N hydrochloric acid, saturated sodium carbonate solution and water. After drying, the solvent was removed in vacuo to give crude (±) - 2-methoxy-N-cyclopropylcarbonylmorphinan, which on distillation had a B.P. of 190–210°/0.05 mm.

EXAMPLE 17

Preparation of (±)-2-methoxy-N-isobutyroylmorphinan

A mixture of 10.0 g. (0.039 mol) of (±)-2-methoxymorphinan and 12.3 g. of isobutyric anhydride was heated at 100° for 25 minutes. The reaction mixture was evaporated to dryness and the residue partitioned between 200 ml. of ether and 50 ml. of diluted ammonium hydroxide. The ether layer was washed with 25 ml. of water and dried. Removal of the solvent gave crude (±)-2-methoxy-N-isobutyroylmorphinan, which on distillation had a B.P. of 180–186°/0.1 mm.

EXAMPLE 18

Preparation of (±)-2-methoxy-N-cyclohexylcarbonylmorphinan

To a solution of 10.1 g. (0.039 mol) of (±)-2-methoxymorphinan in 40 ml. of benzene was added dropwise at room temperature over 5 minutes 11.5 g. of cyclohexane carbonyl chloride. The reaction mixture was refluxed for 2 hours, then cooled to room temperature. The solvent was removed in vacuo. The residue was partitioned between 250 ml. of chloroform and 150 ml. of dilute ammonium hydroxide. The chloroform layer was washed with 50 ml. of water and dried. Removal of the solvent gave crude (±)-2-methoxy-N-cyclohexylcarbonylmorphinan, which on distillation had a B.P. of 222–250°/0.15 mm.

EXAMPLE 19

Preparation of (±)-2-methoxy-N-phenylacetylmorphinan

To a solution of 10.5 g. (0.041 mol) of (±)-2-methoxymorphinan in 40 ml. of benzene was added dropwise at room temperature for 5 minutes, 12.1 g. of phenylacetyl chloride. After refluxing for 2 hours, the reaction mixture was cooled to room temperature and the solvent removed in vacuo. The residue was partitioned between 300 ml. of methylene chloride and 150 ml. of diluted ammonium hydroxide. The methylene chloride layer was washed with 50 ml. of water and dried. Removal of the solvent gave crude (±)-2-methoxy-N-phenylacetylmorphinan, which on distillation had a B.P. of 235–260°/0.1 mm.

EXAMPLE 20

Preparation of (±)-2-methoxy-N-ethylmorphinan

To a suspension of 1.33 g. of lithium aluminum hydride in 50 ml. of anhydrous ether, was added dropwise a solution of 10.5 g. (0.035 mol) of (±)-2-methoxy-N-acetylmorphinan in 90 ml. of anhydrous ether. After the mixture had been refluxed for 8 hours, under nitrogen it was cooled to room temperature and 80 ml. of ethyl acetate followed by 35 ml. of water were added dropwise. The resulting suspension was dried and filtered, and the filtrate concentrated in vacuo to give crude (±)-2-methoxy-N-ethylmorphinan, which on distillation had a B.P. of 175–210°/0.35 mm.

(±)-2-methoxy-N-ethylmorphinan, 2.5 g. (0.0088 mol), on treatment with hydrogen chloride (anhydrous) in ethyl acetate, afforded the crude hydrochloride, which after crystallization from 200 ml. of acetone gave (±)-2-methoxy-N-ethylmorphinan hydrochloride, M.P. 270–274°.

EXAMPLE 21

Preparation of (±)-2-methoxy-N-pentylmorphinan

To a suspension of 0.65 g. of lithium aluminum hydride in 45 ml. of anhydrous tetrahydrofuran, was added over 10 minutes a solution of 5.8 g. (0.017 mol) of (±)-2-methoxy-N-valerylmorphinan in 45 ml. of anhydrous tetrahydrofuran. After the mixture had been refluxed for 3 hours under nitrogen, it was cooled to room temperature and 50 ml. of ethyl acetate followed by 35 ml. of water were added dropwise. The resulting suspension was dried and filtered, and the filtrate concentrated in vacuo to give crude (±)-2-methoxy-N-pentylmorphinan, which on distillation had a B.P. of 210–225°/0.12 mm.

(±)-2-methoxy-N-pentylmorphinan, 1.9 g. (0.058 mol), on treatment with hydrogen bromide (anhydrous) in ethyl acetate afforded the crude hydrobromide. Recrystallization from acetone-ether (2:1) gave pure (±)-2-methoxy-N-pentylmorphinan hydrobromide, M.P. 237–238°.

EXAMPLE 22

Preparation of (±)-2-methoxy-N-isobutylmorphinan

To a suspension of 1.1 g. of lithium aluminum hydride in 70 ml. of anhydrous tetrahydrofuran, was added dropwise over 15 minutes a solution of 9.4 g. (0.028 mol) of (±)-2-methoxy-N-isobutyroylmorphinan in 80 ml. of anhydrous tetrahydrofuran. After the mixture had been refluxed for 2.7 hours under nitrogen it was cooled to room temperature and 65 ml. of ethyl acetate followed by 36 ml. of water were added dropwise. The resulting suspension was dried, filtered and concentrated in vacuo to give crude (±)-2-methoxy-N-isobutylmorphinan, which on distillation had a B.P. of 174–210°/0.15 mm.

(±)-2-methoxy-N-isobutylmorphinan, 2.3 g. (0.0073 mol), on treatment with hydrogen chloride (anhydrous) in ethyl acetate, afforded the crude hydrochloride. Crystallization from acetone-ether (5:1) gave pure (±)-2-methoxy-N-isobutylmorphinan hydrochloride, M.P. 175–177°.

EXAMPLE 23

Preparation of (±)-2-methoxy-N-cyclopropylmethylmorphinan

To a suspension of 2.3 g. of lithium aluminum hydride in 200 ml. of anhydrous tetrahydrofuran was added dropwise over a period of 2 hours, a solution of 19.0 g. (0.058 mol) of (±) - 2 - methoxy-N-cyclopropylcarbonylmorphinan in 100 ml. of anhydrous tetrahydrofuran. After the mixture had been refluxed under nitrogen for 7 hours, it was cooled to room temperature and ethyl acetate followed by water was added dropwise. The resulting suspension was dried, filtered and the filtrate was concentrated to give crude (±)-2-methoxy-N-cyclopropylmethylmorphinan, which on distillation had a B.P. of 180–200°/0.075 mm.

(±)-2 - methoxy-N-cyclopropylmethylmorphinan, 12.6 g. (0.04 mol), on treatment with hydrogen bromide (anhydrous) in ethyl acetate, afforded the crude hydrobromide. Recrystallization from isopropanol gave pure (±)-2-methoxy - N - cyclopropylmethylmorphinan hydrobromide, M.P. 248° (dec.).

EXAMPLE 24

Preparation of (±)-2-methoxy-N-cyclohexylmethyl-morphinan

To a suspension of 1.6 g. of lithium aluminum hydride in 100 ml. of anhydrous tetrahydrofuran was added dropwise 11.4 g. (0.031 mol) of (±)-2-methoxy-N-cyclohexylcarbonylmorphinan in 100 ml. of anhydrous tetrahydrofuran. After the mixture had been refluxed for 3 hours under nitrogen, it was cooled to room temperature and 50 ml. of ethyl acetate followed by 40 ml. of water were added dropwise. The resulting suspension was dried and filtered. The filtrate was concentrated in vacuo to give crude (±)-2-methoxy - N - cyclohexylmethylmorphinan, which on distillation had a B.P. of 200–220°/0.15 mm.

(±)-2-methoxy-N-cyclohexylmethylmorphinan, 2.0 g. (0.057 mol), on treatment with hydrogen bromide (anhydrous) in ethyl acetate, afforded the crude hydrobromide. Recrystallization from acetone-ether (1:1) gave pure (±)-2-methoxy - N - cyclohexylmethylmorphinan hydrobromide, M.P. 186–188°.

EXAMPLE 25

Preparation of (±)-2-methoxy-N-phenethylmorphinan

To a suspension of 1.54 g. lithium aluminum hydride in 70 ml. of anhydrous tetrahydrofuran was added dropwise at room temperature for 15 minutes 15.2 g. (0.041 mol) of (±)-2-methoxy-N-phenylacetylmorphinan in 100 ml. of anhydrous tetrahydrofuran. After the mixture had been refluxed for 3 hours under nitrogen, it was cooled to room temperature and 65 ml. of ethyl acetate followed by 38 ml. of water were added dropwise. The resulting suspension was dried, filtered, and the filtrate concentrated in vacuo to give crude (±) - 2 - methoxy-N-phenethyl-morphinan, which on distillation had a B.P. of 220–240°/0.05 mm.

(±)-2-methoxy-N-phenethylmorphinan, 2.0 g. (0.0055 mol), on treatment with hydrogen bromide (anhydrous) in ethyl acetate, afforded the crude hydrobromide. Recrystallization from acetone-ether (2:1) gave pure (±)-2-methoxy-N-phenethylmorphinan hydrobromide, M.P. 206–208°.

EXAMPLE 26

Preparation of (±)-2-hydroxy-N-ethylmorphinan

A mixture of 7.0 g. (0.0245 mol) of (±)-2-methoxy-N-ethylmorphinan and 56.0 g. of pyridine hydrochloride was heated at 220° with stirring under nitrogen for 25 minutes, cooled in an ice bath, and diluted with water. The mixture was made alkaline with conc. ammonium hydroxide and extracted with chloroform (3× 175 ml.). The extracts were washed with 50 ml. of water and dried. Removal of the solvent gave crude (±) - 2 - hydroxy-N-ethylmorphinan, which on distillation had a B.P. of 200–220°/0.2 mm.; M.P. 78–80°.

(±)-2-hydroxy-N-ethylmorphinan, 6.4 g. (0.023 mol), on treatment with hydrogen bromide (anhydrous) in ethyl acetate, afforded the crude hydrobromide. Crystallization from 225 ml. of isopropanol gave pure (±)-2-hydroxy-N-ethylmorphinan hydrobromide, M.P. 274–275°.

EXAMPLE 27

Preparation of (±)-2-hydroxy-N-pentylmorphinan

A mixture of 3.5 g. (0.011 mol) of (±)-2-methoxy-N-pentylmorphinan and 28.0 g. of pyridine hydrochloride was heated at 220° with stirring under nitrogen for 25 minutes. The mixture was made alkaline with conc. ammonium hydroxide and extracted with 400 ml. of chloroform. The chloroform layer was washed with 50 ml. of water and dried. Removal of the solvent gave crude (±)-2-hydroxy-N-pentylmorphinan, which on distillation had a B.P. of 190–210°/0.12 mm.

(±)-2-hydroxy-N-pentylmorphinan, 3.2 g. (0.01 mol), on treatment with hydrogen chloride (anhydrous) in ethyl acetate, afforded the crude hydrochloride. Crystallization from isopropanol-ether (1:1.5) gave pure (±)-2-hydroxy-N-pentylmorphinan hydrochloride, M.P. 250–251°.

EXAMPLE 28

Preparation of (±)-2-hydroxy-N-isobutylmorphinan

A mixture of 5.0 g. (0.016 mol) of (±)-2-methoxy-N-isobutylmorphinan and 42.0 g. of pyridine hydrochloride was heated at 220° with stirring under nitrogen for 27 minutes, cooled in an ice bath and diluted with water. The mixture was made alkaline with conc. ammonium hydroxide and extracted with 500 ml. of chloroform. The chloroform layer was washed with 50 ml. of water and dried. Removal of the solvent gave the crude (±)-2-hydroxy-N-isobutylmorphinan, which on distillation had a B.P. of 245–270°/0.1 mm.

(±)-2-hydroxy-N-isobutylmorphinan, 4.6 g. (0.015 mol), on treatment with hydrogen bromide (anhydrous) in ethyl acetate afforded the crude hydrobromide. Crystallization from acetone gave pure (±)-2-hydroxy-N-isobutylmorphinan hydrobromide hydrate, M.P. 167–170°.

EXAMPLE 29

Preparation of (±)-2-hydroxy-N-cyclopropylmethyl-morphinan

A mixture of 5.5 g. (0.017 mol) of (±)-2-methoxy-N-cyclopropylmethylmorphinan and 18.0 g. of pyridine hydrochloride was heated at 216° with stirring under nitrogen for 16 minutes, cooled in an ice bath and diluted with 60 ml. of water. The mixture was made alkaline with conc. ammonium hydroxide and extracted with chloroform (210 ml.). The chloroform layer was washed with water and dried. Removal of the solvent gave the crude product which was crystallized from ethyl acetate to give (±)-2-hydroxy - N - cyclopropylmethylmorphinan, M.P. 188–190°.

(±)-2-hydroxy-N-cyclopropylmethylmorphinan, 3.8 g. (0.012 mol), on treatment with hydrogen chloride (anhydrous) in ethyl acetate, afforded the crude hydrochloride, which after crystallization from isopropanol-ethyl acetate, gave (±) - 2-hydroxy-N-cyclopropylmethylmorphinan hydrochloride, M.P. 255–257°.

EXAMPLE 30

Preparation of (±)-2-hydroxy-N-cyclohexylmethyl-morphinan

A mixture of 7.3 g. (0.021 mol) of (±)-2-methoxy-N-cyclohexylmethylmorphinan and 62 g. of pyridine hydrochloride was heated at 220° with stirring under nitrogen for 25 minutes, cooled in an ice bath and diluted with water. The mixture was made alkaline with diluted ammonium hydroxide and extracted with chloroform (500 ml.). The extract was washed with 50 ml. of water and dried. Removal of the solvent gave crude (±)-2-hydroxy-N-cyclohexylmethylmorphinan, which on distillation had a B.P. of 220–245°/0.15 mm.

(±)-2-hydroxy-N-cyclohexylmethylmorphinan, 6.8 g. (0.02 mol), on treatment with hydrogen bromide (anhydrous) in 75 ml. of ethyl acetate-methanol (3:1), afforded the crude hydrobromide. Recrystalliaztion from methanol gave pure (±)-2-hydroxy-N-cyclohexylmethylmorphinan hydrobromide, M.P. 216–217°.

EXAMPLE 31

Preparation of (±)-2-hydroxy-N-phenethylmorphinan

A mixture of 6.25 g. (0.017 mol) of (±)-2-methoxy-N-phenethylmorphinan and 55 g. of pyridine hydrochloride was heated at 220° with stirring under nitrogen for 25 minutes, cooled in an ice bath and diluted with water. The mixture was made alkaline with diluted ammonium hydroxide and extracted with chloroform (600 ml.). The extract was washed with 50 ml. of water and dried. Removal of the solvent gave crude (±)-2-hydroxy-N-phenethylmorphinan, which after crystallization from ether had a M.P. of 192–193°.

(±)-2-hydroxy-N-phenethylmorphinan, 11.4 g. (0.033 mol) on treatment with hydrogen bromide (anhydrous) in 200 ml. of ethyl acetate, afforded the crude hydrobromide. Recrystallization from 250 ml. of methanol gave pure (±)-2-hydroxy-N-phenethylmorphinan hydrobromide, M.P. 320° (dec.).

EXAMPLE 32

Preparation of (+)-2-methoxymorphinan D-tartrate

The combined mother liquors obtained in the preparation of (−)-2-methoxymorphinan 1-tartrate as in Example 34 were concentrated to dryness. The residue in 300 ml. of water was decomposed with conc. ammonium hydroxide. The resulting suspension was extracted with ethyl acetate (3× 200 ml.) and the combined extracts were dried and evaporated to give the crude (+)-base.

d-Tartaric acid, 37.0 g. (0.24 mol), was dissolved in 170 ml. of hot methanol and combined with a hot solution of 60.7 g. (0.23 mole) of the crude (+)-base in 80 ml. of methanol. The solution was heated on a steam bath for a few minutes, seeded with (+)-base salt and allowed to come to room temperature while stirring over a period of 5 hours. The crystals were then collected by filtration, washed with methanol and dried, thus affording the crude (+)-amine salt, M.P. 190–195°, $[\alpha]_D^{25}$ +23.1° (c. 1.00, H$_2$O). Recrystallization from methanol (600 ml.) gave pure (+)-2-methoxymorphinan d-tartrate, M.P. 201–203°, $[\alpha]_D^{25}$ +24.3° (c. 1.01, H$_2$O).

EXAMPLE 33

Preparation of (+)-2-methoxymorphinan (+)-2-methoxymorphinan d-tartrate, 19.2 g. (0.047 mol), in 100 ml. of water was decomposed by addition of conc. ammonium hydroxide. The resulting suspension was extracted with methylene chloride (500 ml.) and the extract was dried and evaporated to give (+)-2-methoxymorphinan, $[\alpha]_D^{25}$ +24.5° (c. 1.00 MeOH). A sample of this compound was distilled, B.P. 150–158°/0.1 mm., $[\alpha]_D^{25}$ +20.26° (c. 0.997, MeOH).

EXAMPLE 34

Resolution of (+)-2-methoxymorphinan 1-tartaric acid, 76.0 g. (0.51 mol), was dissolved in 520 ml. of hot methanol and added to a hot solution of 130 g. (0.51 mole) of (±)-2-methoxymorphinan in 150 ml. of methanol. The solution was heated on a steam bath for a few minutes, seeded with the salt of the (−)-base and allowed to come to room temperature with stirring over a period of 16 hours. The crystals were then collected by filtration, washed with methanol and dried thus affording the crude (−)-amine salt, M.P. 180–183°, $[\alpha]_D^{25}$ −14.5° (c. 0.96, H$_2$O). After three recrystallizations from methanol pure (−)-2-methoxymorphinan 1-tartrate was obtained, M.P. 200–202°, $[\alpha]_D^{25}$ −24.6° (c. 0.99, H$_2$O).

EXAMPLE 35

Preparation of (−)-2-methoxymorphinan (−)-2-methoxymorphinan 1-tartrate, 37.3 g. (0.09 mol), in 100 ml. of water was decomposed by addition of conc. ammonium hydroxide. The resulting suspension was extracted with ethyl acetate (3× 350 ml.) and the combined extracts were dried. Removal of the solvent gave (−)-2-methoxymorphinan, $[\alpha]_D^{25}$ −23.8° (c. 1.05, MeOH). A sample of this compound was distilled, B.P. 158–161°/0.1 mm., $[\alpha]_D^{25}$ −22.02° (c. 0.98, MeOH).

EXAMPLE 36

Preparation of (−)-2-methoxy-N-methylmorphinan

To 12.4 g. (0.048 mol) of (−)-2-methoxymorphinan in 500 ml. of methanol was added 14 ml. of aqueous formaldehyde (37%). The reaction solution was allowed to stand at room temperature overnight. After the addition of 15 g. of Raney nickel and 500 ml. of methanol, the mixture was hydrogenated at atmospheric pressure at room temperature for 24 hours. The catalyst was removed by filtration, washed with methanol and the solvent evaporated in vacuo to give (−)-2-methoxy-N-methylmorphinan, which on distillation had a B.P. of 170–180°/0.5 mm., $[\alpha]_D^{25}$ −38.28° (c. 0.992, MeOH).

(−)-2-methoxy-N-methylmorphinan, 12.4 g. (0.046 mol), on treatment with hydrogen bromide (anhydrous) in ethyl acetate, gave the crude hydrobromide. Recrystallization from acetone afforded pure (−)-2-methoxy-N-methylmorphinan hydrobromide, M.P. 194–196°, $[\alpha]_D^{25}$ −20.0° (c. 1.19, MeOH).

EXAMPLE 37

Preparation of (−)-2-hydroxy-N-methylmorphinan

A mixture of 12.8 g. (0.047 mol) of (−)-2-methoxy-N-methylmorphinan and 100 g. of pyridine hydrochloride was heated at 220° with stirring under nitrogen for 25 min., then cooled in an ice bath and diluted with 100 ml. of water. The mixture was made alkaline with conc. ammonium hydroxide and extracted with chloroform (3× 300 ml.). The extracts were washed with water and dried. Removal of the solvent gave crude (−)-2-hydroxy-N-methylmorphinan, which after crystallization from ethyl acetate had a M.P. of 180–182°, $[\alpha]_D^{25}$ −40.69° (c. 1.15 MeOH).

(−)-2-hydroxy-N-methylmorphinan, 11.7 g. (0.045 mol), on treatment with hydrogen chloride (anhydrous) in ethyl acetate, afforded the crude hydrochloride, which after recrystallization from isopropanol gave pure (−)-2-hydroxy-N-methylmorphinan hydrochloride hydrate, M.P. 176–177° (dec.), $[\alpha]_D^{25}$ −24.15° (c. 0.989, MeOH).

EXAMPLE 38

Preparation of (−)-2-hydroxymorphinan

A mixture of 11.7 g. (0.044 mol) of (−)-2-methoxymorphinan and 100 g. of pyridine hydrochloride was heated at 220° with stirring under nitrogen for 25 minutes, then cooled in an ice bath and diluted with 100 ml. of water. The mixture was made basic with conc. ammonium hydroxide and extracted with chloroform (880 ml.). The extract was washed with 150 ml. of water and dried. Removal of the solvent afforded the crude phenol. Recrystallization from acetonitrile gave pure (−)-2-hydroxymorphinan, M.P. 209–211°, $[\alpha]_D^{25}$ −27.89° (c. 1.05, MeOH).

EXAMPLE 39

Preparation of (−)-2-hydroxy-N-allylmorphinan

A mixture of 5.4 g. (0.022 mol) of (−)-2-hydroxymorphinan, 3.2 g. of allylbromide, 3.8 g. of sodium bicarbonate and 55 ml. of dimethylformamide was stirred and refluxed under nitrogen for 4 hours. The reaction mixture was filtered and the filter cake washed with ethanol. The filtrate was evaporated in vacuo and the residue was dissolved in 100 ml. of ether and filtered from a small amount of insoluble material. The ether solution was extracted with 30 ml. of conc. hydrochloric acid in 120 ml. of water. Addition of conc. ammonium hydroxide to the aqueous phase gave a precipitate of which was removed by filtration. This was dissolved in methylene chloride and dried. Removal of the solvent in vacuo gave (−)-2-hydroxy-N-allylmorphinan, which after recrystallization from benzene-hexane had a M.P. of 154–156°, $[\alpha]_D^{25}$ −61.86° (c. 1.041, MeOH).

(—)-2-hydroxy-N-allylmorphinan, 3.1 g. (0.011 mol), on treatment with hydrogen chloride (anhydrous) in ethyl acetate, afforded the crude hydrochloride, which after crystallization from ethanol gave pure (—)-2-hydroxy-N-allylmorphinan hydrochloride hemiethanolate, M.P. 224–226°, $[\alpha]_D^{25}$ —40.1° (c. 1.06, MeOH).

EXAMPLE 40

Preparation of (—)-2-hydroxy-N-dimethylallylmorphinan

A mixture of 3.7 g. (0.015 mol) of (—)-2-hydroxymorphinan, 1.9 g. of sodium bicarbonate, 2.4 g. of dimethylallyl bromide and 48 ml. of dimethylformamide was heated at reflux with stirring under nitrogen for 4.5 hours. The reaction mixture was filtered and the filter cake washed with ethanol. The filtrate was evaporated in vacuo and the residue was dissolved in ether and filtered from a small amount of insoluble material. The ether solution was extracted with 25 ml. of 2.5 N hydrochloric acid. Addition of conc. ammonium hydroxide to the aqueous phase gave a precipitate which was removed by filtration to give (—)-2-hydroxy-N-dimethylallylmorphinan, which on distillation had a B.P. of 205–210°/0.05 mm., $[\alpha]_D^{25}$ —71.1° (c. 0.501, MeOH).

(—)-2-hydroxy - N - dimethylallylmorphinan, 4.4 g. (0.014 mol), on treatment with hydrogen chloride (anhydrous) in ethyl acetate, afforded the crude hydrochloride, which after crystallization from isopropanol gave (—)-2-hydroxy-N-dimethylallylmorphinan hydrochloride, M.P. 233–236°, $[\alpha]_D^{25}$ —50.3° (c. 0.625, MeOH).

EXAMPLE 41

Preparation of (—)-2-methoxy-N-cyclopropylcarbonylmorphinan

To a solution of 23.0 g. (0.09 mol) of (—)-2-methoxymorphinan, 7.0 ml. of pyridine and 150 ml. of methylene chloride was added 14.0 g. of cyclopropane carboxylic acid chloride in 50 ml. of methylene chloride dropwise over a period of 45 minutes. After the mixture had been refluxed for 15 hours, it was cooled to room temperature and washed successively with water, 2 N hydrochloric acid, saturated sodium carbonate solution and water. After drying, the solvent was removed in vacuo to give (—)-2-methoxy-N-cyclopropylcarbonylmorphinan, which on distillation had a B.P. of 200–205°/0.8 mm., $[\alpha]_D^{25}$ —128° (c. 0.74, MeOH).

EXAMPLE 42

Preparation of (—)-2-methoxy-N-cyclopropylmethylmorphinan

To a suspension of 3.7 g. of lithium aluminum hydride in 350 ml. of anhydrous tetrahydrofuran was added dropwise over a period of 30 minutes, 27.0 g. (0.083 mol) of (—)-2-methoxy-N-cyclopropylcarbonylmorphinan in 150 ml. of anhydrous tetrahydrofuran. After the mixture had been refluxed under nitrogen for 1.5 hours, it was cooled to room temperature, and ethyl acetate followed by water were added dropwise. The resulting suspension was dried, filtered and the filtrate was concentrated to give crude (—)-2-methoxy - N - cyclopropylmethylmorphinan, which on distillation had a B.P. of 160°–170°/0.1 mm., $[\alpha]_D^{25}$ —54.6° (c. 2.46, MeOH).

EXAMPLE 43

Preparation of (—)-2-hydroxy-N-cyclopropylmethylmorphinan (—) - 2-methoxy-N-cyclopropylmethylmorphinan, 24.0 g. (0.077 mol) was divided into three equal portions, each portion was heated at 220° with 50 g. of pyridine hydrochloride with stirring under nitrogen for 25 minutes, cooled in an ice bath and diluted with 50 ml. of water. Then the aqueous suspensions from the three runs were combined, made alkaline with conc. ammonium hydroxide and extracted with chloroform (1000 ml.). The chloroform layer was washed with water and dried. Removal of the solvent gave crude (—)-2-hydroxy-N-cyclopropylmethylmorphinan, which after crystallization from ether had a M.P. of 85–91°, $[\alpha]_D^{25}$ —62.76° (c. 1.04, MeOH).

(—) - 2-hydroxy-N-cyclopropylmethylmorphinan, 19.6 g. (0.066 mol), on treatment with hydrogen chloride (anhydrous) in ethyl acetate, afforded the crude hydrochloride. Two recrystallizations from isopropanol gave pure (—)-2-hydroxy - N - cyclopropylmethylmorphinan hydrochloride, M.P. 262–264° (dec.), $[\alpha]_D^{25}$ —46.7° (c. 1.17, MeOH).

EXAMPLE 44

Preparation of (—)-2-acetoxy-N-cyclopropylmethylmorphinan

A mixture of 2.19 g. (0.007 mol) of (—)-2-hydroxy-N-cyclopropylmethylmorphinan and 20 ml. of acetic anhydride was heated at reflux for 4 hours. The excess reagent was removed in vacuo and the residue was partitioned between ether and dilute ammonium hydroxide. The ether phase was washed with water, dried and concentrated to give crude (—)-2-acetoxy-N-cyclopropylmethylmorphinan, which on distillation had a B.P. of 190–215°/0.3 mm., $[\alpha]_D^{24}$ —61.41° (c. 0.882, MeOH).

(—)-2-acetoxy-N-cyclopropylmethylmorphinan, 2.3 g. (0.007 mol), in ether was treated with a solution of 0.7 g. of oxalic acid in ether to give the crude oxalate. Recrystallization from acetone-ethyl acetate afforded pure (—)-2-acetoxy - N - cyclopropylmethylmorphinan oxalate acetonate, M.P. 100–104°, $[\alpha]_D^{25}$ —42.57° (c. 0.869, MeOH).

EXAMPLE 45

Preparation of (+)-2-methoxy-N-methylmorphinan

To a solution of 12.1 g. (0.047 mol) of (+)-methoxymorphinan in 500 ml. of methanol was added 14 ml. of aqueous formaldehyde (37%). The reaction solution was allowed to stand at room temperature overnight. After addition of 15.0 g. of Raney nickel and 500 ml. of methanol, the mixture was stirred under hydrogen at atmospheric pressure at room temperature for 24 hours. The catalyst was removed by filtration, washed with methanol and the solvent evaporated in vacuo to give (+)-2-methoxy-N-methylmorphinan, which on distillation had a B.P. of 160–165°/0.1 mm., $[\alpha]_D^{25}$ —37.93° (c. 1.02, MeOH).

(+)-2-methoxy - N - methylmorphinan, 11.0 g. (0.04 mol), on treatment with hydrogen bromide (anhydrous) in ether, afforded the crude hydrobromide which, after recrystallization from acetone, gave pure (+)-2-methoxy-N-methylmorphinan hydrobromide, M.P. 192–194°, $[\alpha]_D^{25}$ +20.59° (c. 1.00, MeOH).

EXAMPLE 46

Preparation of (+)-2-hydroxy-N-methylmorphinan

A mixture of 11.9 g. (0.044 mol) of (+)-2-methoxy-N-methylmorphinan and 100 g. of pyridine hydrochloride was heated at 220° with stirring under nitrogen for 25 minutes then cooled in an ice bath, and diluted with 100 ml. of water. The mixture was made alkaline with conc. ammonium hydroxide and extracted with chloroform (900 ml.). The extract was washed with water and dried. Removal of the solvent gave crude (+)-2-hydroxy-N-methylmorphinan, which after crystallization from ether, had a M.P. of 181–183°, $[\alpha]_D^{25}$ +41.4° (c. 0.45, MeOH).

(+)-2-hydroxy - N - methylmorphinan, 11.0 g. (0.04 mol), on treatment with hydrogen chloride (anhydrous) in ethyl acetate, afforded the crude hydrochloride, which after crystallization from ethanol, gave pure (+)-2-hydroxy-N-methylmorphinan hydrochloride hydrate, M.P. 175–178°, $[\alpha]_D^{25}$ +24.0° (c. 1.39, MeOH).

EXAMPLE 47

Preparation of (+)-2-hydroxymorphinan

A mixture of 11.7 g. (0.045 mol) of (+)-2-methoxymorphinan and 100 g. of pyridine hydrochloride was heated at 220° with stirring under nitrogen for 25 minutes, cooled to room temperature and diluted with 100 ml. of water. The mixture was made basic with conc. ammonium hydroxide and extracted with chloroform (800 ml.). The extract was washed with 150 ml. of water and dried. Removal of the solvent afforded the crude phenol. Crystallization from acetonitrile gave pure (+)-2-hydroxymorphinan, M.P. 209–211°, $[\alpha]_D^{25}$ +26.41° (c. 1.07, MeOH).

EXAMPLE 48

Preparation of (+)-2-hydroxy-N-allylmorphinan

A mixture of 6.7 g. (0.027 mol) of (+)-2-hydroxymorphinan, 4.0 g. of allylbromide, 4.8 g. of sodium bicarbonate and 65 ml. of dimethylformamide was stirred and refluxed under nitrogen for 4 hours. The reaction mixture was filtered and the filter cake washed with ethanol. The solvent was removed in vacuo and the residue was dissolved in 100 ml. of ether and filtered from a small amount of insoluble material. The ether solution was extracted with 30 ml. of conc. hydrochloric acid in 120 ml. of water. Addition of conc. ammonium hydroxide to the aqueous phase gave a precipitate which was removed by filtration. This was dissolved in methylene chloride and dried. Removal of the solvent gave (+)-2-hydroxy-N-allylmorphinan, which after recrystallization from benzene-hexane had M.P. of 155–157°, $[\alpha]_D^{25}$ +63.13° (c. 1.06 MeOH).

(+)-2-hydroxy-N-allylmorphinan, 5.5 g. (0.019 mol) on treatment with hydrogen chloride (anhydrous) in ethyl acetate, afforded the crude hydrochloride which after crystallization from ethanol gave pure (+)-2-hydroxyallylmorphinan hydrochloride hemiethanolate, M.P. 224–226°, $[\alpha]_D^{25}$ +40.9° (c. 1.20, MeOH).

EXAMPLE 49

Preparation of (+)-2-hydroxy-N-dimethylallylmorphinan

A mixture of 1.00 g. (0.004 mol) of (+)-2-hydroxymorphinan, 0.505 g. of sodium bicarbonate, 0.640 g. of dimethylallyl bromide and 12 ml. of dimethylformamide were heated at reflux with stirring under nitrogen for 4.5 hours. The reaction mixture was filtered and the filter cake washed with ethanol. The solvent was removed in vacuo and the residue was dissolved in ether and filtered from a small amount of ether-insoluble material. The ether solution was extracted with 25 ml. of 2.5 N hydrochloric acid. Addition of conc. ammonium hydroxide to the aqueous phase gave a precipitate which was removed by filtration to give crude (+)-2-hydroxy-N-dimethylallylmorphinan, M.P. 93–95°. A sample of this compound was distilled, B.P. 200–205°/0.2 mm., $[\alpha]_D^{25}$ +71.64° (c. 1.105, MeOH).

(+)-2 - hydroxy - N - dimethylallylmorphinan, 5.1 g. (0.016 mol), on treatment with hydrogen chloride (anhydrous) in ethyl acetate, afforded the crude hydrochloride which after crystallization from acetone, gave pure (+)-2-hydroxy-N-dimethylallylmorphinan hydrochloride, M.P. 230°–232°, $[\alpha]_D^{25}$ +49.78° (c. 1.94, MeOH).

EXAMPLE 50

Preparation of (+)-2-methoxy-N-cyclopropylcarbonylmorphinan

To a solution of 19.8 g. (0.077 mol) of (+)-2-methoxymorphinan in 140 ml. of methylene chloride and 6.05 g. of triethylamine was added dropwise over a period of 45 minutes. 12.1 g. cyclopropane carboxylic acid chloride in 40 ml. of methylene chloride. After the mixture had been refluxed for 18 hours under nitrogen, it was cooled to room temperature and washed successively with 100 ml. of water, 100 ml. of 2 N hydrochloric acid, 100 ml. of saturated sodium carbonate solution and 100 ml. of water. After drying, the solvent was removed in vacuo to give crude (+)-2-methoxy - N - cyclopropylcarbonylmorphinan, which on distillation had a B.P. of 215–220°/0.25 mm., $[\alpha]_D^{25}$ +152° (c. 1.34 MeOH).

EXAMPLE 51

Preparation of (+)-2-methoxy-N-cyclopropylmethylmorphinan

To a suspension of 3.3 g. of lithium aluminum hydride in 300 ml. of anhydrous tetrahydrofuran was added dropwise over a period of 30 minutes, 23.6 g. (0.07 mol) of (+)-2-methoxy-6-cyclopropylcarbonylmorphinan in 130 ml. of anhydrous tetrahydrofuran. After the mixture had been refluxed for 1.5 hours under nitrogen, it was cooled to room temperature and 100 ml. of ethyl acetate followed by 25 ml. of water were added dropwise. The resulting suspension was dried, filtered and the filtrate was concentrated to give crude (+)-2-methoxy - N - cyclopropylmethylmorphinan, which on distillation had a B.P. of 185–195°/0.3 mm., $[\alpha]_D^{25}$ +59.5° (c. 0.85, MeOH).

EXAMPLE 52

Preparation of (+)-2-hydroxy-N-cyclopropylmethylmorphinan (+)-2-methoxy-N - cyclopropylmethylmorphinan, 20.6 g. (0.065 mol) was divided into three equal portions, each portion was heated with 50 g. of pyridine hydrochloride at 220° with stirring under nitrogen for 25 minutes, cooled in an ice bath and diluted with 50 ml. of water. The aqueous suspensions (from the three portions) were combined, made basic with conc. ammonium hydroxide and extracted with chloroform (1500 ml.) and dried. Removal of the solvent gave crude (+)-2-hydroxy-N-cyclopropylmethylmorphinan, which after crystallization from ether, had a M.P. of 84–90°, $[\alpha]_D^{25}$ +63.6° (c. 0.705, MeOH).

(+)-2-hydroxy-N - cyclopropylmethylmorphinan, 18.0 g. (0.06 mol), on treatment with hydrogen chloride (anhydrous) in ethyl acetate, afforded the crude hydrochloride which, after crystallization from isopropanol, gave pure (+)-2-hydroxy-N-cyclopropylmethylmorphinan hydrochloride, M.P. 262–264°, $[\alpha]_D$ +47.9° (c. 0.94, MeOH).

EXAMPLE 53

Preparation of (+)-2-acetoxy-N-cyclopropylmethylmorphinan

A mixture of 2.9 g. (0.0097 mol) of (+)-2-hydroxy-N-cyclopropylmethylmorphinan and 20 ml. of acetic anhydride was heated at reflux for 3 hours. The excess reagent was removed in vacuo and the residue was partitioned between ethyl acetate and aqueous sodium carbonate. The ethyl acetate phase was washed with 50 ml. of 2 N NaOH, 100 ml. of water, dried and concentrated to give crude (+)-2-acetoxy-N-cyclopropylmethylmorphinan, which on distillation had a B.P. of 185–190°/0.2 mm., $[\alpha]_D^{25}$ +59.21° (c. 0.86 MeOH).

(+)-2-acetoxy-N-cyclopropylmethylmorphinan, 1.7 g. (0.005 mol), in ether was treated with a solution of 0.6 g. of oxalic acid in ether to give the crude oxalate, which on crystallization from acetone-ether, afforded pure (+)-2-acetoxy-N-cyclopropylmethylmorphinan oxalate acetonate, M.P. 100–104°, $[\alpha]_D^{25}$ +41.87° (c. 1.06, MeOH).

EXAMPLE 54

Preparation of (±)-2- and (±)-4-methoxymorphinan

A crude mixture of (1:1) of 131 g. (0.46 mol) of (±)-2- and (±) - 4 - methoxy-N-formylmorphinan dissolved in 3 l. of ethanol (2B) and 1.2 l. of 2.5 N aqueous sodium hydroxide was heated at reflux for 15 hours, then the ethanol was removed in vacuo and the resulting aqueous suspension extracted with methylene chloride. Removal of the solvent in vacuo yielded a residue. This was dissolved in ethyl acetate and extracted with 2 N hydrochloric acid. The aqueous solution was made basic with aqueous sodium hydroxide and extracted with ethyl acetate. The extract was washed with water and dried. Removal of the solvent gave crude (±)-2- and (±)-4-methoxymorphinan.

EXAMPLE 55

Preparation of (±)-2- and (±)-4-methoxy-N-methylmorphinan

A crude mixture of 75.7 g. (0.29 mol) of (±)-2- and (±)-4-methoxymorphinan in 800 ml. of methanol and 86 ml. of aqueous formaldehyde (37%) was allowed to stand at room temperature for 15 hours. After addition of 85.0 g. of Raney nickel and 2.2 l. of methanol, the mixture was hydrogenated at atmospheric pressure at room temperature for 20 hours. The catalyst was removed by filtration and washed with methanol. The solvent evaporated in vacuo to give crude (±)-2- and (±)-4-methoxy-N-methylmorphinan.

EXAMPLE 56

Preparation of (±)-2-methoxy-N-methylmorphinan salicylate

A mixture of (1:1) of 74.3 g. (0.27 mol) of (±)-2- and (±)-4-methoxy-N-methylmorphinan and 42.0 g. of salicylic acid in 200 ml. of ethyl acetate was heated until solution occurred, then was seeded with (±)-2-methoxy-N-methylmorphinan salicylate and allowed to crystallize. The crystals were then collected by filtration, washed with ethyl acetate and dried, thus affording crude (±)-2-methoxy-N-methylmorphinan salicylate, which after recrystallization from ethyl acetate has a M.P. of 187–189°.

EXAMPLE 57

Preparation of (±)-2-methoxy-N-methylmorphinan (±)-2-methoxy-N-methylmorphinan salicylate, 47.5 g. (0.12 mol), in water was decomposed with conc. ammonium hydroxide. The resulting suspension was extracted with ethyl acetate and the combined extracts were dried. Removal of the solvent in vacuo gave (±)-2-methoxy-N-methylmorphinan.

EXAMPLE 58

Preparation of (±)-4-methoxy-N-methylmorphinan salicylate

The mother liquor obtained in the preparation of (±)-2-methoxy-N-methylmorphinan salicylate was concentrated to a volume of about 75 ml. then seeded with (±)-4-methoxy-N-methylmorphinan salicylate and allowed to crystallize. The crystals were then collected by filtration, washed with ethyl acetate and dried, thus affording crude (±)-4-methoxy-N-methylmorphinan salicylate, which after recrystallization from ethyl acetate has a M.P. of 154–155°.

EXAMPLE 59

Preparation of (±)-4-methoxy-N-methylmorphinan (±)-4-methoxy-N-methylmorphinan salicylate, 1.5 g. (0.0037 mol), in 20 ml. of water was decomposed by addition of conc. ammonium hydroxide. The resulting suspension was extracted with ether (3× 25 ml.) and the combined extracts were washed with water and dried. Removal of the solvent gave the crude product, which was distilled, B.P. 175–180°/0.1 mm., then recrystallized from ether, M.P. 80–81°, to give pure (±)-4-methoxy-N-methylmorphinan.

(±)-4-methoxy-N-methylmorphinan, 1.2 g. (0.0044 mol), on treatment with hydrogen chloride (anhydrous) in ethyl acetate, afforded the crude hydrochloride. Recrystallization from isopropanol gave pure (±)-4-methoxy-N-methylmorphinan hydrochloride, M.P. 240–241°.

EXAMPLE 60

Preparation of (±)-4-hydroxy-N-methylmorphinan

A mixture of 5.0 g. (0.02 mol) of (±)-4-methoxy-N-methylmorphinan and 42 g. of pyridine hydrochloride was heated at 220° with stirring under nitrogen for 25 minutes, then cooled in an ice bath and diluted with 50 ml. of water. The mixture was partitioned between 300 ml. of dilute ammonium hydroxide and 450 ml. of ether. The ether layer was dried and removal of the solvent gave crude (±)-4-hydroxy-N-methylmorphinan, which after recrystallization from ethyl acetate had a M.P. of 218–220°.

(±)-4-hydroxy-N-methylmorphinan, 3.0 g. (0.012 mol), on treatment with hydrogen bromide (anhydrous) in ethyl acetate, afforded the crude hydrobromide which after recrystallization from isopropanol gave pure (±)-4-hydroxy-N-methylmorphinan hydrobromide, M.P. 265° (dec.).

EXAMPLE 61

Resolution of (±)-4-methoxy-N-methylmorphinan

A mixture of 15.1 g. (0.056 mol) of (±)-4-methoxy-N-methylmorphinan, 22.0 g. (0.05 mol) of di-(p-toluoyl)-1-tartaric acid and 400 ml. of ethanol was heated until solution occurred, then allowed to stand at room temperature for 15 hours. The crystals were then collected by filtration, washed with ethanol and dried, thus affording the crude (−)-amine salt, which after two recrystallizations from methanol, gave pure (−)-4-methoxy-N-methylmorphinan di-(p-toluoyl)-1-tartrate, M.P. 167–168°, $[\alpha]_D^{25}$ +83.2° (c. 0.515, MeOH).

EXAMPLE 62

Preparation of (−)-4-methoxy-N-methylmorphinan (−)-4-methoxy-N-methylmorphinan di-(p-toluoyl)-1-tartrate, 29.4 g. (0.047 mol), in water was decomposed with conc. ammonium hydroxide. The resulting suspension was extracted with ether and the combined extracts were dried. Removal of the solvent gave (−)-4-methoxy-N-methylmorphinan, $[\alpha]_D^{25}$ −15.8° (c. 1.00, MeOH), which after crystallization from hexane, had a M.P. of 98–100°, $[\alpha]_D^{25}$ −17.24° (c. 0.997, MeOH).

(−)-4-methoxy-N-methylmorphinan, 4.6 g. (0.017 mol), on treatment with hydrogen chloride (anhydrous) in ethyl acetate, afforded the crude hydrochloride, which after recrystallization from ethyl acetate, gave pure (−)-4-methoxy-N-methylmorphinan hydrochloride, M.P. 203–205°, $[\alpha]_D^{25}$ −8.97° (c. 0.958, H₂O).

EXAMPLE 63

Preparation of (+)-4-methoxy-N-methylmorphinan di-(p-toluoyl)-d-tartrate

The combined mother liquors obtained in the preparation of (−)-4-methoxy-N-methylmorphinan di-(p-toluoyl)-1-tartrate were concentrated to dryness. The residue in water was decomposed with conc. ammonium hydroxide. The resulting suspension was extracted with ether and the combined extracts were dried. Removal of the solvent gave crude (+)-4-methoxy-N-methylmorphinan. The crude (+)-4-methoxy-N-methylmorphinan, 9.2 g. (0.034 mol), 13.0 g. (0.034 mol) of di-(p-toluoyl)-d-tartaric acid and 150 ml. of ethanol was heated until solution occurred, then was allowed to stand at room temperature for 15 hours. The crystals were then collected by filtration, washed with ethanol and dried, thus affording the crude (+)-amine salt. Recrystallization from ethanol gave pure (+)-4-methoxy-N-methylmorphinan di-(p-toluoyl)-d-tartrate, M.P. 167–168°, $[\alpha]_D^{25}$ −80.78° (c. 0.519, MeOH).

EXAMPLE 64

Preparation of (+)-4-methoxy-N-methylmorphinan (+) - 4 - methoxy-N-methylmorphinan di-(p-toluoyl)-d-tartrate, 26.4 g. (0.04 mol), in water was decomposed by addition of conc. ammonium hydroxide. The resulting suspension was extracted with ethyl acetate and the combined extracts were dried. Removal of the solvent gave (+) - 4 - methoxy - N-methylmorphinan, $[\alpha]_D^{25}$ +15.7° (c. 1.11, MeOH), which after crystallization from hexane had a M.P. of 98–100°, $[\alpha]_D^{25}$ +16.58° (c. 1.04, MeOH).

(+)-4-methoxy-N-methylmorphinan, 3.9 g. (0.014 mol), on treatment with hydrogen chloride (anhydrous) in ethyl acetate, afforded/crude hydrochloride. Recrystallization from ethyly acetate gave pure (+)-4-methoxy-N-methylmorphinan hydrochloride, M.P. 204–206°, $[\alpha]_D^{25}$ +8.78° (c. 0.934, H$_2$O).

EXAMPLE 65

Preparation of (−)-4-hydroxy-N-methylmorphinan

A mixture of 1.8 g. (0.0066 mol) of (−)-4-methoxy-N-methylmorphinan and 20.0 g. of pyridine hydrochloride was heated at 220° with stirring under nitrogen for 25 minutes then cooled in an ice bath and diluted with 20 ml. of water. The mixture was made basic with conc. ammonium hydroxide and extracted with chloroform (100 ml.). The extract was washed with water and dried. Removal of the solvent gave crude (−)-4-hydroxy-N-methylmorphinan, which after recrystallization from ether, had a M.P. of 216–217°, $[\alpha]_D^{25}$ −34.99° (c. 1.07, MeOH).

(−)-4-hydroxy-N-methylmorphinan, 1.70 g. (0.0063 mol), on treatment with hydrogen chloride (anhydrous) in 15 ml. of ethyl acetate afforded the crude hydrochloride, which after recrystallization from ethanol, gave (−)-4-hydroxy-N-methylmorphinan hydrochloride, M.P. 303–305°, $[\alpha]_D^{25}$ −17.94° (c. 0.958, MeOH).

EXAMPLE 66

Preparation of (−)-4-methoxy-N-cyclopropylcarbonylmorphinan

To a solution of 11.2 g. (0.041 mol) of (−)-4-methoxy-N-methylmorphinan in 95 ml. of dry toluene, 21.6 g. of cyclopropane carboxylic acid chloride in 35 ml. of dry toluene was added dropwise at 5° for 1 hour. The mixture was allowed to warm to room temperature and was then refluxed for 15 hours. The solvent was removed in vacuo and the residue partitioned between ether and 3 N hydrochloric acid. The ether layer was washed successively with water, dilute ammonium hydroxide and water and dried. Removal of the solvent afforded the crude product. Recrystallization from ether gave pure (−)-4-methoxy-N-cyclopropylcarbonylmorphinan, M.P. 126–128°, $[\alpha]_D^{25}$ −176.31° (c. 1.071, MeOH).

EXAMPLE 67

Preparation of (−)-4-methoxy-N-cyclopropylmethylmorphinan

To a suspension of 1.0 g. of lithium aluminum hydride hydride in 85 ml. of anhydrous tetrahydrofuran was added dropwise 7.2 g. (0.022 mol) of (−)-4-methoxy-N-cyclopropylcarbonylmorphinan in 35 ml. of anhydrous tetrahydrofuran. After the mixture had been refluxed under nitrogen for 3 hours, it was cooled to room temperature and ethyl acetate followed by water was aded dropwise. The resulting suspension was dried, filtered and the filtrate was concentrated to give crude (−)-4-methoxy-N-cyclopropylmethylmorphinan, which after recrystallization from ethyl acetate had a M.P. of 82–84°, $[\alpha]_D^{25}$ −54.97° (c. 1.00, MeOH).

(−)-4-methoxy-N-cyclopropylmethylmorphinan, 0.3 g. (0.001 mol), on treatment with hydrogen chloride (anhydrous) in ethyl acetate, afforded the crude hydrochloride, which after two recrystallizations from isopropanol, gave (−)-4-methoxy-N-cyclopropylmethylmorphinan hydrochloride, M.P. 270–272°, $[\alpha]_D^{25}$ −35.29° (c. 1.00, MeOH).

EXAMPLE 68

Preparation of (−)-4-hydroxy-N-cyclopropylmethylmorphinan

A mixture of 6.0 g. (0.02 mole) of (−)-4-methoxy-N-cyclopropylmethylmorphinan and 50 g. of pyridine hydrochloride was heated at 220° with stirring under nitrogen for 25 minutes, cooled in an ice bath and diluted with 50 ml. of water. The mixture was made basic with conc. ammonium hydroxide and extracted with chloroform (500 ml.). The extract was washed with water and dried. Removal of the solvent gave crude (−)-4-hydroxy-N-cyclopropylmethylmorphinan, which after crystallization from ether had a M.P. of 169–171°, $[\alpha]_D^{25}$ −70.03° (c. 1.01, MeOH).

(−)-4-hydroxy-N-cyclopropylmethylmorphinan, 3.4 g. (0.011 mol), on treatment with hydrogen chloride (anhydrous) in ethyl acetate, afforded the crude hydrochloride, which after recrystallization from isopropanol, had a M.P. of 271–273°, $[\alpha]_D^{25}$ −51.57° (c. 0.99, MeOH).

EXAMPLE 69

Preparation of (+)-4-hydroxy-N-methylmorphinan

A mixture of 1.79 g. (0.0066 mol) of (+)-4-methoxy-N-methylmorphinan and 20.0 g. of pyridine hydrochloride was heated at 220° with stirring under nitrogen for 25 minutes, cooled in an ice bath and diluted with 20 ml. of water. The mixture was made basic with conc. ammonium hydroxide and extracted with chloroform. The extract was washed with 20 ml. of water and dried. Removal of the solvent gave crude (+)-4-hydroxy-N-methylmorphinan, which after recrystallization from ether gave pure (+)-4-hydroxy-N-methylmorphinan, M.P. 218–219°, $[\alpha]_D^{25}$ +33.86, (c. 1.01, MeOH).

(+)-4-hydroxy-N-methylmorphinan, 1.39 g. (0.0054 mol), on treatment with hydrogen chloride (anhydrous) in 15 ml. of ethyl acetate, afforded the crude hydrochloride, which after recrystallization from ethanol, gave pure (+)-4-hydroxy-N-methylmorphinan hydrochloride, M.P. 300–302°, $[\alpha]_D^{25}$ +18.08° (c. 1.01, MeOH).

EXAMPLE 70

Preparation of (+)-4-methoxy-N-cyclopropylcarbonylmorphinan

To a solution of 11.1 g. (0.041 mol) of (+)-4-methoxy-N-methylmorphinan in 95 ml. of dry toluene, 21.6 g. of cyclopropane carboxylic acid chloride in 35 ml. of dry toluene was added dropwise at 5° for 1 hour. The mixture was allowed to warm to room temperature and was then refluxed for 15 hours. The solvent was removed in vacuo and the residue partitioned between ether and 3 N hydrochloric acid. The ether layer was washed successively with water, dilute ammonium hydroxide and water and dried. Removal of the solvent afforded crude (+)-4-methoxy-N-cyclopropylcarbonylmorphinan, which after recrystallization from ether gave pure (+)-4-methoxy-N-cyclopropylcarbonylmorphinan, M.P. 126–128°, $[\alpha]_D^{25}$ +177.06° (c. 1.01, MeOH).

EXAMPLE 71

Preparation of (+)-4-methoxy-N-cyclopropylmethylmorphinan

To a suspension of 1.0 g. of lithium aluminum hydride in 85 ml. of anhydrous tetrahydrofuran was added dropwise, 7.2 g. (0.022 mol) of (+)-4-methoxy-N-cyclopropylcarbonylmorphinan in 35 ml. of anhydrous tetrahydrofuran. After the mixture had been refluxed under nitrogen for 3 hours it was cooled to room temperature and ethyl acetate followed by water was added dropwise. The resulting suspension was dried, filtered and the filtrate was concentrated to give crude (+)-4-methoxy-N-cyclopropylmethylmorphinan, which after recrystallization from ethyl acetate, had a M.P. of 82–84°, $[\alpha]_D^{25}$ +55.94° (c. 0.99, MeOH).

(+)-4 - methoxy - N - cyclopropylmethylmorphinan, 0.3 g. (0.001 mol), on treatment with hydrogen chloride (anhydrous) in ethyl acetate, afforded the crude hydrochloride, which after two recrystallizations from isopropanol, gave pure (+) - 4 - methoxy-N-cyclopropylmethylmorphinan hydrochloride, M.P. 270–272°, $[\alpha]_D^{25}$ +37.75° (c. 1.00, MeOH).

EXAMPLE 72

Preparation of (+)-4-hydroxy-N-cyclopropylmethylmorphinan

A mixture of 5.8 g. (0.019 mol) of (+)-4-methoxy-N-cyclopropylmethylmorphinan and 50 g. of pyridine hydrochloride was heated at 220° with stirring under nitrogen for 25 minutes, cooled in an ice bath and diluted with 50 ml. of water. The mixture was made basic with conc. ammonium hydroxide and extracted with chloroform (500 ml.). The extract was washed with water and dried. Removal of the solvent gave crude (+)-4-hydroxy-N-cyclopropylmethylmorphinan, which after recrystallization from ether had a M.P. of 169–171°, $[\alpha]_D^{25}$ +68.7° (c. 0.73, MeOH).

(+) - 4 - hydroxy-N-cyclopropylmethylmorphinan, 5.0 g. (0.02 mol), on treatment with hydrogen chloride (anhydrous) in ethyl acetate, afforded the crude hydrochloride, which after recrystallization from isopropanol gave pure (+) - 4 - hydroxy-N-cyclopropylmethylmorphinan hydrochloride, M.P. 271–273°, $[\alpha]_D^{25}$ +51.91° (c. 1.04, MeOH).

EXAMPLE 73

Resolution of (±)-1-(m-methoxybenzyl)-1,2,3,4,5,6,7,8-octahydroisoquinoline

A solution of 158.0 g. (0.615 mol) of (±)-1-(m-methoxybenzyl)-1,2,3,4,5,6,7,8-octahydroisoquinoline in 400 ml. of hot ethanol (2B) was added to a refluxing solution of 95.5 g. (0.637 mol) of d-tartaric acid in 950 ml. of ethanol (2B). The resulting solution was seeded with a few milligrams of (−)-1-(m-methoxybenzyl-1,2,3,4,5,6,7,8-octahydroisoquinoline d-tartrate and allowed to cool to room temperature with stirring for 15 hours. The crystals were then collected by filtration, washed with ethanol, and dried at 60° over a period of 5 hours under reduced pressure, thus affording 239.0 g. of crude (−)-1-(m-methoxybenzyl) - 1,2,3,4,5,6,7,8 - octahydroisoquinoline d-tartrate, M.P. 170–172°. For recrystallization, this compound was dissolved in 2500 ml. of refluxing methanol and then 1900 ml. of the solvent was distilled off at atmospheric pressure. The concentrated solution was seeded as above with the same (−)-base d-tartrate and stirred at room temperature for 15 hours. The crude (−)-1-(m-methoxybenzyl) - 1,2,3,4,5,6,7,8 - octahydroisoquinoline d-tartrate after separation and drying amounted to 182.0 g., M.P. 176–177°. A third recrystallization using the same conditions as above afforded 127.0 g. of material, M.P. 186–188°. A fourth and final recrystallization (the same conditions as above) yielded 160.0 g. of pure (−)-1-(m-methoxybenzyl) - 1,2,3,4,5,6,7,8 - octahydroisoquinoline d-tartrate, M.P. 191–193°.

EXAMPLE 74

Conversion of (−)-1-(m-methoxybenzyl)-1,2,3,4,5,6,7,8-octahydroisoquinoline d-tartrate to the free base 511.5 g. (1.25 mol) of (−)-1-(m-methoxybenzyl-1,2,3,4,5,6,7,8-octahydroisoquinoline d-tartrate was suspended in 1 l. of water and 500 ml. of concentrated ammonium hydroxide was added. The resulting suspension was extracted with a total of 2.1 l. of ether. The ether extracts were dried (MgSO₄) and removal of the solvent gave 315.5 g. (98%) of crude (−)-1-(m-methoxybenzyl)-1,2,3,4,5,6,7,8-octahydroisoquinoline. For analysis a sample of this compound was distilled, B.P. 154–158°/0.3 mm.

EXAMPLE 75

Preparation of (+)-1-(m-methoxybenzyl)-1,2,3,4,5,6,7,8-octahydroisoquinoline 1-tartrate The filtrates obtained in the preparation of (−)-base d-tartrate in Example 73 were concentrated to dryness and the residue was treated with 200 ml. of concentrated ammonium hydroxide and 600 ml. of water. The resulting suspension was extracted with ether (3 × 1 l.). The combined ether solutions were dried and the solvent was removed under reduced pressure. The crude (+)-1-(m-methoxybenzyl) - 1,2,3,4,5,6,7,8 - octahydroisoquinoline, 89.0 g. (0.346 mol), in 200 ml. of hot ethanol (2B) was combined with a refluxing solution of 53.8 g. (0.354 mol) of 1-tartaric acid in 520 ml. of ethanol (2B). The resulting solution was seeded with a few milligrams of (+)-1-(m-methoxybenzyl - 1,2,3,4,5,6,7,8 - octahydroisoquinoline 1-tartrate and stirred at room temperature for 15 hours. The crystals were then collected by filtration, washed with ethanol and dried at 60° over a period of 5 hours under reduced pressure thus affording 129.4 g. of crude (+)-base 1-tartrate, M.P. 184–186°. This compound was recrystallized, as previously described for the (−)-base d-tartrate in Example 73 from 3 l. of methanol concentrated to 1 l. Stirring overnight at room temperature and filtering the crystals gave 112.0 g. (90%) of pure (+)-1-(m-methoxybenzyl) - 1,2,3,4,5,6,7,8 - octahydroisoquinoline 1-tartrate, M.P. 189–191°.

EXAMPLE 76

Conversion of (+)-1-(m-methoxybenzyl)-1,2,3,4,5,6,7,8-octahydroisoquinoline 1-tartrate to the free base 378.5 g. of (0.93 mol. of (+)-1-(m-methoxybenzyl)-1,2,3,4,5,6,7,8 - octahydroisoquinoline 1-tartrate was suspended in 1 l. of water and 300 ml. of conc. ammonium hydroxide was added. The resulting suspension was extracted with a total of 3 l. of ether. The ether extracts were dried (MgSO₄) and removal of the solvent gave 236.9 g. of crude (+)-1-(m-methoxybenzyl)-1,2,3,4,5,6,7,8-octahydroisoquinoline. For analysis a sample of this compound was distilled, B.P. 156–160°/0.3 mm.

EXAMPLE 77

Formylation of (+)-1-(m-methoxybenzyl)-1,2,3,4,5,6,7,8-octahydroisoquinoline

A mixture of 236.5 g. (0.92 mol) of (+)-1-(m-methoxybenzyl) - 1,2,3,4,5,6,7,8 - octahydroisoquinoline, 2.4 g. of sodium methoxide and 2400 ml. of methyl formate was heated at reflux for 65 hours. The reaction mixture was concentrated under reduced pressure and the residue was dissolved in 2 l. of ethyl acetate and washed successively with water (200 ml.), 1 N hydrochloric acid (200 ml.), water (200 ml.) 1 N sodium hydroxide (700 ml.) and water (200 ml.). The ethyl acetate solutions was dried (MgSO₄) and evaporated to give 261.8 g. of crude (−)-1-(m - methoxybenzyl) - N - formyl - 1,2,3,4,5,6,7,8-octahydroisoquinoline. For analysis a sample of this compound was distilled, B. P. 185–195°/0.05 mm.

EXAMPLE 78

Acid catalyzed cyclization of (−)-1-(m-methoxybenzyl)-N-formyl-1,2,3,4,5,6,7,8-octahydroisoquinoline (−)-1-(m - methoxybenzyl) - N - formyl-1,2,3,4,5,6,7,8-octahydroisoquinoline, 131.0 g. (0.46 mol) was combined under stirring with 1000 g. of phosphoric acid (99.3%) which had been mixed with 20 g. of concentrated sulfuric acid and the mixture was heated in a nitrogen atmosphere to 70°. The resulting homogeneous solution was kept at 70° for 16 hours. The reaction mixture was cooled and poured onto 1.5 l. of a mixture of ice and water. The resulting suspension was extracted with ethyl acetate (a total of 4 l.), the combined organic phases were washed with water (2× 1 l.) and dried (MgSO₄). Filtration and concentration gave 111.3 g. of a mixture of crude (—)-2- and (—) - 4 - methoxy - N - formylmorphinan.

EXAMPLE 79

Hydrolysis of (—)-2- and (—)-4-methoxy-N-formylmorphinan

A crude mixture of 111.0 g. (0.389 mol) of (—)-2- and (—)-4-methoxy - N - formylmorphinan dissolved in 2.5 l. of ethanol (2B) and 1.0 l. of 2.5 N aqueous sodium hydroxide was heated at reflux for 22 hours, then the ethanol was removed in vacuo. To the resulting aqueous suspension, 500 ml. of water was added and extracted with methylene chloride (a total of 3 l.). The methylene chloride solution was washed with water (1 l.) and dried (MgSO₄). Removal of the solvent gave 95.1 g. of a mixture of crude (—)-2- and (—)-4-methoxymorphinan.

EXAMPLE 80

Separation of (—)-2-methoxymorphinan phosphate

A mixture of 94.5 g. (0.368 mol) of (—)-2- and (—)-4-methoxymorphinan was dissolved in 700 ml. of 2-propanol. The stirred solution was heated gently on the steam bath with dropwise addition, during 1 hour, of a solution of 29 ml. of concentrated phosphoric acid (85%) in 180 ml. of 2-propanol. After the addition was complete, the mixture was stirred for an additional 10 minutes and the product was collected by filtration, washed with 2-propanol (2× 100 ml.) then with ether (2× 100 ml.) and dried at 60° over a period of 15 hours under reduced pressure, thus affording 110.9 g. of crude (—)-2-methoxymorphinan phosphate. The crude phosphate salt 61.4 g. (0.173 mol) was dissolved in 4 l. of refluxing methanol and 2.6 l. of the solvent was distilled off at atmospheric pressure. The mixture was stirred at room temperature for 15 hours, then the crude (—)-2-methoxymorphinan phosphate was separated by filtration and washed with methanol (100 ml.), then with ether (2× 100 ml.) and dried thus affording 36.0 g. of pure (—)-2-methoxymorphinan phosphate, M.P. 242–245°.

The mother liquors from the recrystallization were concentrated to about 75 ml. and allowed to stand at room temperature for 15 hours. The solids were collected by filtration, washed with methanol and dried giving 8.1 g. of crude (—)-2-methoxymorphinan phosphate which is 84% pure by gas chromatography and was used for the next recrystallization. The mother liquors after removal of the (—)-2-methoxymorphinan were saved for the isolation of the (—)-4-methoxymorphinan.

EXAMPLE 81

Conversion of (—)-2-methoxymorphinan phosphate to (—)-2-methoxymorphinan (—)-2-methoxymorphinan phosphate, 91.0 g. (0.256 mol) in 400 ml. of water was decomposed with 75 ml. of concentrated ammonium hydroxide. The resulting suspension was extracted with ethyl acetate (a total of 3 l.) and the combined extracts were washed with water (2× 200 ml.) and dried (MgSO₄). Removal of the solvent in vacuo gave 62.0 g. of crude (—)-2-methoxymorphinan. A sample of (—)-2-methoxymorphinan was distilled, B.P. 158–161°/0.1 mm.

EXAMPLE 82

Preparation of (—)-2-methoxy-N-cyclopropylcarbonylmorphinan

To a solution of 62.0 g. (0.241 mol) of (—)-2-methoxymorphinan, 50.5 g. of triethylamine, and 350 ml. of methylene chloride was added 37.6 g. (0.36 mol) of cyclopropane carboxylic acid chloride in 200 ml. of methylene chloride dropwise over a period of 20 minutes. After the mixture had been refluxed for 15 hours, it was cooled to room temperature and washed successively with 2 N hydrochloric acid (200 ml.), water (400 ml.), saturated aqueous sodium carbonate (200 ml.), and water (400 ml.). After drying (MgSO₄), the solvent was removed in vacuo to give 77.1 g. of crude (—)-2-methoxy-N-cyclopropylcarbonylmorphinan. A sample was distilled, B.P. 200–205°/0.8 mm.

EXAMPLE 83

Reduction of (—)-2-ethoxy-N-cyclopropylcarbonylmorphinan

A solution of 77.0 g. (0.236 mol) of (—)-2-methoxy-N-cyclopropylcarbonylmorphinan in 195 ml. of dry benzene (dried over sodium) was added dropwise over a period of 1 hour with stirring to a solution of 96.5 ml. of 70% sodium bis-(2-methoxyethoxy) aluminum hydride in 190 ml. of dry benzene at room temperature. During the course of the addition, the reaction temperature rose to 70°, but cooling was not necessary. After the mixture had been stirred at room temperature for 3 hours under nitrogen, it was cooled in an ice-water bath, and 50 ml. of saturated sodium chloride solution was added dropwise. The resulting suspension was dried (MgSO₄), filtered and the filtrate was concentrated to give 71.9 g. of crude (—) - 2-methoxy-N-cyclopropylmethylmorphinan. A sample was distilled, B.P. 160–170°/0.1 mm.

EXAMPLE 84

O-demethylation of (—)-2-methoxy-N-cyclopropylmethylmorphinan (—)-2-methoxy-N-cyclopropylmethylmorphinan, 73.9 g. (0.238 mol) was divided into 13 equal portions (5.6 g. each), each portion was heated at 220° with 50 g. of pyridine hydrochloride with stirring under nitrogen for 25 minutes, cooled in an ice bath and 50 ml. of water was added. Then the aqueous solution from the 13 runs were combined, made alkaline with concentrated ammonium hydroxide, and extracted with a total of 4 l. of chloroform. The chloroform extracts were washed with water (2× 1 l.) and dried (MgSO₄). Removal of the solvent gave an oil which was dissolved in benzene and the solvent was removed again in vacuo and this procedure was repeated several times in order to remove all the pyridine and yield the crude (—)-2-hydroxy-N-cyclopropylmethylmorphinan, 60.9 g. For analysis, a sample of this compound was crystallized from ether, M.P. 85–91°.

EXAMPLE 85

Hydrochloride of (—)-2-hydroxy-N-cyclopropylmethylmorphinan (—)-2-hydroxy-N-cyclopropylmethylmorphinan, 60.9 g. (0.205 mol), in 600 ml. of ethyl acetate, on slow addition of hydrogen chloride (anhydrous) in ethyl acetate, gave the crude hydrochloride which after 1 hour of stirring at room temperature was separated by filtration and was dried. This crude product was dissolved in 1200 ml. of hot 2-propanol and after standing at room temperature for 15 hours was separated by filtration and was dried, thus affording 54.9 g. of (—)-2-hydroxy-N-cyclopropylmethylmorphinan hydrochloride, M.P. 263–265°.

From the mother liquor an additional 13.5 g. of the hydrochloride was isolated by concentrating the solution to about 400 ml. and allowing to crystallize at 5° overnight.

EXAMPLE 86

Formylation of (—)-1-(m-methoxybenzyl)-1,2,3,4,5,6,7,8-octahydroisoquinoline

To a solution of 303.2 g. (1.18 mol) of (—)-1-(m-methoxybenzyl)-1,2,3,4,5,6,7,8-octahydroisoquinoline in 414 ml. of chloroform was added 192.0 g. (1.3 mol) of chloral in 179 ml. of chloroform dropwise over a period of 35 minutes. After the mixture had been stirred for one hour at room temperature, it was diluted with 200 ml. of chloroform and washed successively with 2 N hydrochloric acid (2× 200 ml.), 2 N sodium hydroxide (2× 100 ml.) and water (200 ml.). After drying (MgSO₄), the solvent was removed in vacuo to give 331.1 g. of crude (+)-1-(m-methoxybenzyl)-N-formyl-1,2,3,4,5,6,7,8-octahydroisoquinoline. For analysis, a sample of this compound was distilled, B.P. 185–195°/0.05 mm.

EXAMPLE 87

N-formyl-1,2,3,4,5,6,7,8-octahydroisoquinoline N-formyl-1,2,3,4,5,6,7,8-octahydroisoquinoline (+)-1-(m-methoxybenzyl) - N - formyl - 1,2,3,4,5,6-7,8-octahydroisoquinoline, 145.0 g. (0.51 mol), was combined under stirring with 1065 g. of phosphoric acid (99.4%) which had been mixed with 21.3 g. of conc. sulfuric acid and the mixture was heated in a nitrogen atmosphere to 70°. The resulting homogeneous solution was kept at 70° for 20 hours. The reaction mixture was cooled and poured onto 1.5 l. of a mixture of ice and water. The suspension was extracted with ethyl acetate (a total of 1.6 l.), the combined organic phases were washed with water (3× 500 ml.) and dried (MgSO₄). Filtration and concentration gave 121.1 g. of crude (+)-2- and (+)-4-methoxy-N-formylmorphinan.

EXAMPLE 88

Hydrolysis of (+)-2- and (+)-4-methoxy-N-formylmorphinan

A crude mixture of 121.1 g. (0.42 mol) of (+)-2- and (+) - 4 - methoxy - N - formylmorphinan dissolved in 2.7 l. of ethanol (2B) and 1.09 l. of 2.5 N aqueous sodium hydroxide was heated at reflux for 16.5 hours, then the ethanol was removed in vacuo. To the resulting aqueous suspension, 500 ml. of water was added and this was extracted with methylene chloride (a total of 2 l.). The methylene chloride solution was washed with water (3× 200 ml.) and dried. Removal of the solvent gave 101.8 g. of crude (+)-2- and (+)-4-methoxymorphinan.

EXAMPLE 89

Separation of (+)-2-methoxymorphinan phosphate

A mixture of 78.2 g. (0.30 mol) of (+)-2- and (+)-4-methoxymorphinan was dissolved in 550 ml. of 2-propanol. The stirred solution was heated gently on the steam bath while adding dropwise, during 1 hour, a solution of 24.3 ml. of concentrated phosphoric acid (85%) in 141 ml. of 2-propanol. After the addition was complete, the mixture was stirred for an additional 19 hours and the product was collected by filtration, washed with 2-propanol (2× 100 ml.), then with ether (2× 100 ml.) and dried at 60° over a period of 15 hours under reduced pressure, thus affording 88.4 g. of crude (+)-2-methoxymorphinan phosphate. The crude phosphate salt 50.0 g. (0.14 mol) was dissolved in 3 l. of refluxing methanol and 2.0 l. of the solvent was distilled at atmospheric pressure. The mixture was stirred at room temperature for 16 hours, then the crude (+)-2-methoxymorphinan phosphate was separated by filtration and washed with methanol (100 ml.) then with ether (2× 100 ml.) and dried, thus affording 30.1 g. of pure (+)-2-methoxymorphinan phosphate, M.P. 241–243°.

The mother liquors from the recrystallization were concentrated to about 75 ml. and allowed to stand at room temperature for 16 hours. The solids were collected by filtration and dried giving 4.6 g. of crude (+)-2-methoxymorphinan phosphate which was used for the next recrystallization. The mother liquors after removal of the (+)-2-methoxymorphinan were saved for the isolation of the (+)-4-methoxymorphinan.

EXAMPLE 90

Conversion of (+)-2-methoxymorphinan phosphate to (+)-2-methoxymorphinan (+) - 2 - methoxymorphinan phosphate, 91.0 g. (0.26 mol) in 400 ml. of water was decomposed with 80 ml. of concentrated ammonium hydroxide. The resulting suspension was extracted with ethyl acetate (2× 1 l.) and the combined extracts were washed with water (2× 150 ml.) and dried (MgSO₄). Removal of the solvent in vacuo gave 63.0 g. of crude (+)-2-methoxymorphinan. A sample was distilled, B.P. 158–161°/0.1 mm.

EXAMPLE 91

Preparation of (+)-2-methoxy-N-cyclopropylcarbonylmorphinan

To a solution of 63.0 g. (0.245 mol) of (+)-2-methoxymorphinan, 357 ml. of methylene chloride and 51.5 g. (0.51 mol) of triethylamine was added 38.3 g. (0.366 mol) of cyclopropane carboxylic acid chloride in 204 ml. of methylene chloride dropwise over a period of 25 minutes. After the mixture had been refluxed for 16 hours, it was cooled to room temperature and washed successively with 2 N hydrochloric acid (2× 200 ml.), water (200 ml.), saturated aqueous sodium carbonate (200 ml.) and water (2× 200 ml.). After drying (MgSO₄), the solvent was removed in vacuo to give 82.0 g. of crude (+)-2-methoxy - N - cyclopropylcarbonylmorphinan. For analysis, a sample of this compound was distilled, B.P. 215–220°/0.25 mm.

EXAMPLE 92

Reduction of (+)-2-methoxy-N-cyclopropylcarbonylmorphinan

A solution of 82.0 g. (0.25 mol) of (+)-2-methoxy-N-cyclopropylcarbonylmorphinan in 203 ml. of dry benzene (dried over sodium) was added dropwise over a period of one hour with stirring to a solution of 103.0 ml. of 70% sodium bis-(2-methoxyethoxy)aluminum hydride in 203 ml. of dry benzene at room temperature. During the course of the addition, the reaction temperature rose to about 70°, but cooling was not necessary. After the mixture had been stirred at room temperature overnight under nitrogen, it was cooled in an ice-water bath, and 50 ml. of a saturated sodium chloride solution was added dropwise. The resulting suspension was dried (MgSO₄), filtered and the filtrate was concentrated to give 75.1 g. of crude (+)-2-methoxy-N-cyclopropylmethylmorphinan. For analysis, a sample of this compound was distilled, B.P. 185–195°/0.3 mm.

EXAMPLE 93

O-demethylation of (+)-2-methoxy-N-cyclopropylmethylmorphinan (+)-2-methoxy-N - cyclopropylmethylmorphinan, 75.1 g. (0.241 mol) was divided into 13 equal portions and each portion was heated at 220° with 50 g. of pyridine hydrochloride with stirring under nitrogen for 25 minutes, cooled in an ice bath and 50 ml. of water was added. Then the aqueous solutions from the 13 runs were combined, made alkaline with concentrated ammonium hydroxide and extracted with a total of 2.4 l. of chloroform. The chloroform extracts were washed with water (3× 500 ml.) and dried (MgSO₄). Removal of the solvent gave an oil which was dissolved in benzene and the solvent was removed again in vacuo and this procedure was repeated several times in order to remove all the pyridine to yield the crude (+)-2-hydroxy-N-cyclopropylmethylmorphinan, 67.8 g. For analysis, a sample of this compound was crystallized from ether, M.P. 84–90°.

EXAMPLE 94

Hydrochloride of (+)-2-hydroxy-N-cyclopropyl-methylmorphinan (+)-2-hydroxy-N - cyclopropylmethylmorphinan, 58.8 g. (0.198 mol), in 490 ml. of ethyl acetate on slow addition of hydrogen chloride (anhydrous) in ethyl acetate, gave the crude hydrochloride which after 16 hours of stirring at room temperature was separated by filtration and dried. This crude product was dissolved in 900 ml. of hot 2-propanol and after standing at room temperature for 15 hours was separated by filtration and dried, thus affording 48.0 g. of pure (+)-2-hydroxy-N-cyclopropylmethylmorphinan hydrochloride, M.P. 263–264°.

EXAMPLE 95

Capsule formulation

| | Mg. per capsule |
|---|---|
| (—) - 2 - hydroxy - N - cyclopropylmethylmorphinan hydrochloride | 5 |
| Lactose | 178 |
| Corn starch | 37 |
| Talc | 5 |
| Total weight | 225 |

Procedure:

(1) (—) - 2 - hydroxy - N - cyclopropylmethylmorphinan was mixed with the lactose and corn starch in a suitable mixer.
(2) The mixture was further blended by passing through a Fitzpatrick comminuting machine with a #1A screen with knives forward).
(3) The blended powder was returned to the mixer, the talc added and blended thoroughly. The mixture was then filled into #4 hard shell gelatin capsules on a Parke Davis capsulating machine (any similar type machine may be used).

EXAMPLE 96

Suppository formulation

| | Gm. per 1.3 gm. suppository |
|---|---|
| (—)-2-hydroxy - N - cyclopropylmethylmorphinan hydrochloride | 0.005 |
| Wecobee M [1] | 1.250 |
| Carnauba wax | 0.045 |

[1] E. F. Drew Company, 522 Fifth Avenue, New York, N.Y.

Procedure:

(1) The Wecobee M and the carnauba wax were melted in a suitable size glass lined container (stainless steel may also be used), mixed well and cooled to 45° C.
(2) (—) - 2 - hydroxy - N - cyclopropylmethylmorphinan, which has been reduced to a fine powder with no lumps, was added and stirred until completely and uniformly dispersed.
(3) The mixture was poured into suppository molds to yield suppositories having an individual weight of 1.3 gms.
(4) The suppositories were cooled and removed from molds. They were individually wrapped in wax paper for packaging. (Foil may be used.)

EXAMPLE 97

Tablet formulation

| | Mg. per tablet |
|---|---|
| (—) - 2 - hydroxy - N - cyclopropylmethylmorphinan hydrochloride | 2.50 |
| Dicalcium phosphate, unmilled | 232.50 |
| Corn starch | 12.50 |
| Magnesium stearate | 2.50 |
| Total weight | 250.00 |

Procedure:

(1) (—) - 2 - hydroxy - N - cyclopropylmethylmorphinan and corn starch were blended in a suitable size mixer.
(2) The mix was then blended with an equal quantity of dicalcium phosphate.
(3) The mixture was blended for five minutes with the balance of the dicalcium phosphate and magnesium stearate.
(4) The mixture was then compressed.

EXAMPLE 98

Tablet formulation

| | Mg. per tablet |
|---|---|
| (—) - 2 - hydroxy - N - cyclopropylmethylmorphinan hydrochloride | 25.00 |
| Dicalcium phosphate dihydrate, unmilled | 175.00 |
| Corn starch | 24.00 |
| Magnesium stearate | 1.00 |
| Total weight | 225.00 |

Procedure:

(1) (—)-2-hydroxy-N-cyclopropylmethylmorphinan and corn starch were mixed together and passed through a #00 screen in Model "J" Fitzmill with hammers forward.
(2) This premix was then mixed with dicalcium phosphate and one-half of the magnesium stearate, passed through a #1A screen in Model "J" Fitzmill with knives forward, and slugged.
(3) The slugs were passed through a #2A plate in a Model "D" Fitzmill at slow speed with knives forward, and the remaining magnesium stearate was added.
(4) The mixture was mixed and compressed.

EXAMPLE 99

Parenteral formulation

Each 1 cc. ampul contains:

| | Per cc. |
|---|---|
| (—)-2-hydroxy-N-cyclopropylmethylmorphinan hydrochloride | mg 5.1 |
| Benzyl alcohol | cc 0.1 |
| Water for Injection, U.S.P. | cc Q.s. ad 1 |

Procedure (for 10,000 cc.):

(1) In a clean glass or glass-lined vessel, 8,000 cc. of Water for Injection were heated to 90° C. It was then cooled to 50–60° C., and benzyl alcohol was added and dissolved with stirring. The solution was then allowed to cool to room temperature.
(2) The 51.0 grams of (—)-2-hydroxy-N-cyclopropyl-methylmorphinan were added under an atmosphere of nitrogen and stirred until completely dissolved.
(3) Sufficient Water for Injection was then added to make a total volume of 10,000 cc.
(4) This solution was then filtered through a 02 Selas candle, filled into suitable size ampuls, gassed with nitrogen and sealed.

EXAMPLE 100

Following the procedures set forth in Examples 73–77 above, capsule, suppository, tablet and parenteral formulations can be prepared incorporating as the active ingredient:

(+)-2-hydroxy-N-cyclopropylmethylmorphinan;
(±)-2-hydroxy-N-cyclopropylmethylmorphinan;
(—)-2-hydroxy-N-allylmorphinan;
(—)-4-hydroxy-N-cyclopropylmethylmorphinan; and
(—)-2-acetoxy-N-cyclopropylmethylmorphinan.

We claim:
1. A compound of the formula

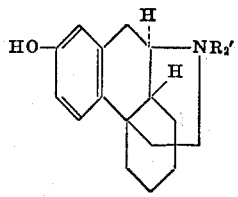

wherein $R_2'$ signifies hydrogen, lower alkyl having from 3 to 7 carbon atoms, cycloalkyl-lower alkyl wherein the cycloalkyl moiety has from 3 to 4 carbon atoms and the lower alkyl moiety has from 1 to 4 carbon atoms, lower alkenyl having from 2 to 7 carbon atoms or phenyl-lower alkyl having from 1 to 4 carbon atoms the pharmaceutically acceptable acid addition salts thereof and optical antipodes thereof.

2. A compound of claim 1 wherein $R_2'$ is cycloalkyl-lower alkyl, the cycloalkyl moiety having from 3 to 4 carbon atoms and the lower alkyl moiety having from 1 to 4 carbon atoms.

3. The compound of claim 2 which is (±)-2-hydroxy-N-cyclopropylmethylmorphinan.

4. The compound of claim 2 which is (+)-2-hydroxy-N-cyclopropylmethylmorphinan.

5. The compound of claim 2 which is (−)-2-hydroxy-N-cyclopropylmethylmorphinan.

6. A compound of claim 1 wherein $R_2'$ is lower alkenyl.

7. The compound of claim 6 which is (±)-2-hydroxy-N-allylmorphinan.

8. The compound of claim 6 which is (+)-2-hydroxy-N-allylmorphinan.

9. The compound of claim 6 which is (−)-2-hydroxy-N-allylmorphinan.

10. The compound of claim 6 which is (±)-2-hydroxy-N-(3,3-dimethylallyl)morphinan.

11. The compound of claim 6 which is (+)-2-hydroxy-N-dimethylallylmorphinan.

12. The compound of claim 6 which is (−)-2-hydroxy-N-dimethylallylmorphinan.

References Cited

UNITED STATES PATENTS

| | | | |
|---|---|---|---|
| 2,885,401 | 5/1969 | Grüssner et al. | 260—285 |
| 3,285,922 | 11/1966 | Gates | 260—285 |
| 3,634,429 | 1/1972 | Leimgruber et al. | 260—285 |
| 3,707,470 | 12/1972 | Sawa et al. | 260—285 |

FOREIGN PATENTS

| | | | |
|---|---|---|---|
| 165,071 | 1/1950 | Austria | 260—285 |
| 143,107 | 8/1951 | Australia | 260—285 |

DONALD G. DAUS, Primary Examiner

U.S. Cl. X.R.

260—285 Y, 286 R, 287 R, 289 R, 521 R, 559 R, 563 R; 424—260